(12) United States Patent
Schwarte et al.

(10) Patent No.: US 6,602,972 B1
(45) Date of Patent: Aug. 5, 2003

(54) SELF CROSSLINKING POLYURETHANES AND GRAFT COPOLYMERS AND BASED ON POLYURETHANE, FOR PRODUCING COATING MATERIALS, ADHESIVES AND SEALING MASSES

(75) Inventors: Stephan Schwarte, Emsdetten (DE); Egon Wegner, Veitshöchheim (DE); Harald Angermüller, Würzburg (DE)

(73) Assignee: BASF Coatings AG, Münster (DE)

( * ) Notice: Subject to any disclaimer, the term of this patent is extended or adjusted under 35 U.S.C. 154(b) by 0 days.

(21) Appl. No.: 10/111,730

(22) PCT Filed: Oct. 9, 2000

(86) PCT No.: PCT/EP00/09849

§ 371 (c)(1),
(2), (4) Date: Apr. 26, 2002

(87) PCT Pub. No.: WO01/34674

PCT Pub. Date: May 17, 2001

(30) Foreign Application Priority Data

Nov. 6, 1999 (DE) .......................................... 199 53 445

(51) Int. Cl.⁷ .............................................. C08G 18/80
(52) U.S. Cl. ............................ 528/45; 528/69; 528/71; 525/63; 525/124; 524/839; 524/840; 427/407.1
(58) Field of Search ............................ 528/45, 69, 71; 525/124, 63; 524/839, 840; 427/407.1

(56) References Cited

U.S. PATENT DOCUMENTS

| 5,093,412 A | 3/1992 | Mente et al. ............... 524/762 |
| 5,109,091 A | 4/1992 | Schafheutle et al. ........ 524/561 |
| 5,691,425 A | 11/1997 | Klein et al. ................. 525/455 |
| 6,063,861 A | 5/2000 | Irle et al. |
| 6,162,506 A | 12/2000 | Lettmann et al. ........ 427/407.1 |

FOREIGN PATENT DOCUMENTS

| CA | 2073115 | 7/1992 | .......... C09D/175/14 |
| CA | 2261232 | 10/1997 | .......... C08F/283/00 |
| DE | 19639325 | 3/1998 | .......... C08F/283/00 |
| DE | 19645761 | 5/1998 | |
| DE | 19722862 | 1/1999 | .......... C09D/151/08 |
| DE | 19753222 | 6/1999 | ............ C08L/75/04 |
| EP | 331 409 | 2/1989 | .............. C08J/7/04 |
| EP | 472 081 | 8/1991 | .......... C08F/220/04 |
| EP | 51 533 | 4/1992 | ............ C08G/18/63 |
| EP | 522 419 | 6/1992 | ............ C08G/18/67 |
| EP | 522 420 | 6/1992 | ............... C08J/3/03 |
| EP | 608 021 | 1/1994 | .......... C08D/151/08 |
| WO | WO93/324551 | 12/1993 | ............ C08G/18/42 |
| WO | WO98/54266 | 12/1998 | .......... C09D/151/08 |

OTHER PUBLICATIONS

Chemical Abstracts Accession No. XP002159435 Abstract for JP07292046 Nov. 1995.
JAPIO Abstract for JP01256512—Oct. 1989.
T.J. Chen: "Preparation and Polymerization of new dual active functional monomers" Polym. Mater. Sci. Eng., Bd. 57, 1987, pp. 565–569, XP000926156 p. 566.

*Primary Examiner*—Rachel Gobb

(57) ABSTRACT

Self crosslinking polyurethane comprising lateral or terminal ethenylarylene groups, produced by reacting a polyurethane pre-polymer with an adduct, obtained by reacting an ethenylarylene mono-isocyanate with a compound containing hydroxyl groups or amino groups such that at least one group that is reactive to isocyanate remains in the adduct. Also, a self crosslinking graft copolymer containing at least one (meth)acrylate copolymer and at least one polyurethane produced by dispersing at least one self crosslinking olefinically unsaturated polyurethane comprising lateral or terminal ethenylarylene groups and blocked isocyanate groups in an aqueous medium and by radical copolymerization of a mixture of a monomer comprising at least one functional group that is reactive to isocyanate with a monomer that can be copolymerised with the mixture.

28 Claims, No Drawings

SELF CROSSLINKING POLYURETHANES AND GRAFT COPOLYMERS AND BASED ON POLYURETHANE, FOR PRODUCING COATING MATERIALS, ADHESIVES AND SEALING MASSES

This application is a national phase application of PCT/EP00/09849 filed Oct. 9, 2000.

The present invention relates to novel self-crosslinking polyurethanes and to novel self-crosslinking, polyurethane-based graft copolymers. The present invention further relates to novel processes for preparing self-crosslinking polyurethanes and self-crosslinking, polyurethane-based graft copolymers. The present invention additionally relates to the use of the novel self-crosslinking polyurethanes and of the novel self-crosslinking, polyurethane-based graft copolymers for preparing self-crosslinking coating materials, adhesives, and sealing compounds. The present invention relates, furthermore, to novel self-crosslinking coating materials, adhesives, and sealing compounds, especially aqueous self-crosslinking coating materials, adhesives, and sealing compounds. The present invention relates not least to novel coatings, adhesive films, and seals obtainable from the novel, especially aqueous, self-crosslinking coating materials, adhesives, and sealing compounds. The present invention relates in particular to decorative and/or protective, single-coat or multicoat paint systems, especially multicoat color and/or effect paint systems.

In the context of the present invention, the term "self-crosslinking" denotes the property of a binder (regarding the term cf. Römpp Lexikon Lacke und Druckfarben, Georg Thieme Verlag, Stuttgart, New York, 1998, "Binders", pages 73 and 74) to undergo crosslinking reactions with itself. A precondition for this is that the binders already contain both types of complementary reactive functional groups necessary for crosslinking. Externally crosslinking, on the other hand, is used to denote those coating materials, adhesives, and sealing compounds in which one type of the complementary reactive functional groups is present in the binder and the other type in a curing or crosslinking agent. For further details on this point, refer to Römpp Lexikon Lacke und Druckfarben, Georg Thieme Verlag, Stuttgart, New York, 1998, "Curing", pages 274 to 276, especially page 275, bottom.

Externally crosslinking graft copolymers soluble or dispersible in water are known from European patent EP-A-0 608 021. They consist of a core comprising a hydrophobic olefinically unsaturated polyurethane and a shell comprising a hydrophilic acrylate copolymer having an acid number of from 30 to 120 mg KOH/g. The hydrophobic olefinically unsaturated polyurethane is prepared by reacting low molecular mass diols or polyester diols with an acid number of less than 5 mg KOH/g with diisocyanates and 1-(1-isocyanato-1-methylethyl)-3-(1-methylethenyl)benzene (dimethyl-m-isopropenyl-benzyl isocyanate), thereby giving, in particular, terminal ethylenearylene groups. Thereafter, a mixture of olefinically unsaturated monomers is polymerized in solution in the presence of the hydrophobic olefinically unsaturated polyurethane, after which the resulting graft copolymer is neutralized and dispersed in water to give a secondary dispersion. These known secondary dispersions are used for preparing clearcoat materials. Pigmented coating materials or sealing compounds and adhesives are not disclosed by EP-A-0 608 021.

German patent DE-C-197 22 862 discloses an externally crosslinking graft copolymer obtainable by polymerizing olefinically unsaturated monomers in a dispersion of an olefinically unsaturated polyurethane containing hydrophilic functional groups and having on average from 0.05 to 1.1 polymerizable double bonds per molecule. For the preparation of the polyurethane main chains it is possible, in accordance with DE-C-197 22 862, to use not only diisocyanates but also polyisocyanates, whose functionality is decreased by adding monoisocyanates. 1-(1-Isocyanato-1-methylethyl)-3-(1-methylethenyl)benzene is given as an example of a monoisocyanate. Where used, it contributes to a certain extent to the polymerizable double bond content of the polyurethane, although the compounds envisaged for introducing it are primarily compounds which contain isocyanate-reactive functional groups and olefinically unsaturated double bonds, such as hydroxyalkyl (meth)acrylates, for example.

The same externally crosslinking polyurethane and the externally crosslinking graft copolymer based on it are also disclosed by German patent application DE-A-196 45 761. There again, 1-(1-isocyanato-1-methylethyl)-3-(1-methylethenyl)benzene, referred to therein as isopropenyl-alpha,alpha-dimethylbenzyl isocyanate, is used.

The known externally crosslinking graft copolymers of DE-C-197 22 862 and of DE-A-196 45 761 are in the form of primary dispersions and are very highly suitable for preparing aqueous externally crosslinking coating materials, especially aqueous basecoat materials. The aqueous basecoat materials may be used with advantage for the wet-on-wet technique, in which the aqueous basecoat material is applied to a primed or unprimed substrate and then the resultant aqueous basecoat film is dried but not crosslinked. Atop the dried aqueous basecoat film there is then applied a clearcoat material, after which the aqueous basecoat film and the clearcoat film are cured together to form a multicoat color and/or effect paint system.

These known aqueous basecoat materials are crosslinked using hydrophobic crosslinking agents which must be incorporated into the aqueous coating materials by way of cosolvents or emulsifiers. Owing to their hydrophobic properties and the resultant comparatively poor dispersion in the aqueous coating material, it is necessary to incorporate larger amounts of crosslinking agents than would be necessary per se for sufficient crosslinking and adhesion of the resulting coating, particularly of the aqueous basecoat material. Moreover, the cosolvents again raise the emission of organic substances on drying and curing, which the use of aqueous coating materials was intended specifically to decrease or prevent entirely. Moreover, residues of crosslinking agents, emulsifiers, and cosolvents have adverse effects on the so-called flash-off behavior of the known aqueous basecoat films, which is manifested in a reduction in the coat thickness above which cracking (mud cracking) and popping marks appear. Although it might be possible to a certain extent to use hydrophilic crosslinking agents to remove the disadvantages associated with the use of the cosolvents and emulsifiers, there would then be a fall in the condensation resistance and weathering stability of the corresponding coatings.

In the context of the present invention, the property of hydrophilicity denotes the constitutional property of a molecule or functional group to penetrate into the aqueous phase or to remain therein. Accordingly, in the context of the present invention, the property of hydrophobicity denotes the constitutional property of a molecule or functional group to behave exophilically with respect to water, i.e., to tend not to penetrate into water or to tend to depart the aqueous phase. For further details, refer to Römpp Lexikon Lacke und Druckfarben, Georg Thieme Verlag, Stuttgart, New York, 1998, "Hydrophilicity", "Hydrophobicity", pages 294 and 295.

The problems depicted above are exacerbated if the known aqueous basecoat materials are used together with powder slurry clearcoat materials for producing multicoat color and/or effect paint systems.

Moreover, in some cases the amount of olefinically unsaturated groups in the polyurethanes may prove too low for complete grafting, so that a large part of the monomers to be grafted on may form separate homopolymers and/or copolymers alongside the polyurethane, which may adversely affect the performance properties of the graft copolymers and of the coating materials, adhesives, and sealing compounds prepared using them.

Because of its high reactivity, the ethenyl-arylene group constitutes a very good grafting site for the attachment by polymerization of olefinically unsaturated monomers. However, the introduction of these groups by way of 1-(1-isocyanato-1-methylethyl)-3-(1-methylethenyl)benzene causes problems, since owing to the steric hindrance the isocyanate group is comparatively slow to react, necessitating either long reaction times and/or high reaction temperatures, both of which may lead to product damage. Moreover, this compound cannot easily be used to introduce pendant ethenylarylene groups into the polyurethanes, except where the polyurethane already contains lateral isocyanate-reactive groups with which the compound is able to react.

The German patent application with DE-A-197 53 222 discloses a primary dispersion of a self-crosslinking graft copolymer which is preparable by free-radical emulsion polymerization of vinyl monomers, of which at least one carries an acetoacetoxy group, in the presence of a saturated polyurethane containing (potentially) anionic groups. The resultant graft copolymer becomes self-crosslinking by the addition of polyamines such as diethylenetriamine which are bonded ionically to the binder, i.e., the graft copolymer. Crosslinking proceeds even at room temperature with the formation of an enamine, which severely impairs the storage stability. The known primary dispersion is used for preparing clearcoat materials. Whether it is also suitable for the preparation of aqueous basecoat materials, DE-A-197 53 222 does not reveal. The high level of polyamines gives cause for concern that these known primary dispersions might yellow at temperatures such as are commonly employed in the production of multicoat color and/or effect paint systems for automobile bodies. Moreover, the problems depicted above that are linked with deficient grafting activity occur here to an increased extent owing to the use of saturated polyurethanes.

It is an object of the present invention to provide novel self-crosslinking olefinically unsaturated polyurethanes which can be prepared purposively and simply without the risk of product damage, and which constitute outstanding graft bases for olefinically unsaturated monomers.

It is a further object of the present invention to find a novel process for preparing self-crosslinking olefinically unsaturated polyurethanes which purposively, simply, and without the risk of product damage provides hydrophilic or hydrophobic polyurethanes containing pendant and/or terminal ethenylarylene groups.

Yet another object of the present invention is to find novel self-crosslinking graft copolymers, particularly in the form of primary dispersions, which can be prepared simply, purposively, and without the risk of product damage.

Still another object of the present invention is to provide novel aqueous and nonaqueous self-crosslinking coating materials, adhesives, and sealing compounds based on polyurethane and having very good performance properties. The intention in particular is to provide novel self-crosslinking coating materials, especially novel aqueous self-crosslinking coating materials, specifically novel self-crosslinking aqueous basecoat materials, which no longer have the disadvantages of the prior art but are instead outstandingly suitable for application by the wet-on-wet technique. In this context, even when using powder clearcoat slurries, there ought to be no cracking (mud cracking) or popping marks or pinholes. The novel coating materials ought to have very good storage stability and outstanding application properties, such as very good leveling and very little tendency to run even at high film thicknesses. The resultant multicoat paint systems ought to have an outstanding overall appearance and also high chemical stability, yellowing resistance, and weathering stability. Moreover, no delamination of the coats following the waterjet test should occur. All of these advantages should be achievable without having to accept an increase in the emission of organic compounds.

Found accordingly has been the novel self-crosslinking polyurethane (B) containing at least one pendant and/or at least one terminal ethenylarylene group and preparable by (1) reacting at least one polyurethane prepolymer (B1) containing at least one free and at least one blocked isocyanate group with (2) at least one adduct (B2) obtainable by
    (2.1) reacting at least one ethenylarylene monoisocyanate and
    (2.2) at least one polyol, polyamine and/or at least one compound containing at least one hydroxyl group and at least one amino group
with one another such that at least one isocyanate-reactive group remains in the adduct (B2).

The novel self-crosslinking polyurethane containing at least one pendant and/or at least one terminal ethenylarylene group is referred to below for the sake of brevity as "polyurethane of the invention".

Also found has been the novel self-crosslinking graft copolymer comprising

A) at least one (meth)acrylate copolymer and
B) at least one polyurethane and preparable by
    1) dispersing at least one self-crosslinking olefinically unsaturated polyurethane (B) containing at least one pendant and/or at least one terminal ethenylarylene group and at least one blocked isocyanate group in an aqueous medium and then
    2) subjecting a mixture of at least one monomer (a1) containing at least one isocyanate-reactive functional group and at least one monomer (a2) copolymerizable therewith to free-radical copolymerization in emulsion in the presence of the polyurethane (B) or of the polyurethanes (B).

Also found have been the novel adhesives, sealing compounds, and coating materials, especially surface coating materials and in particular aqueous surface coating materials, specifically aqueous basecoat materials, which comprise at least one polyurethane (B) of the invention and/or at least one graft copolymer of the invention and are referred to below as adhesives, sealing compounds, and coating materials of the invention.

Found not least have been novel adhesive films, seals, and coatings, especially surface coatings, produced by means of the adhesives, sealing compounds, and coating materials of the invention and referred to below as adhesive films, seals, and coatings of the invention.

Found, moreover, have been novel substrates which comprise at least one adhesive film, seal and/or coating of the invention and are referred to below as substrates of the invention.

Further subject matter of the invention will emerge from the description.

In the light of the prior art it was surprising and unforeseeable for the skilled worker that the complex problem on which the present invention was based could be solved by means of the polyurethanes (B) of the invention and/or the graft copolymers of the invention. A particular surprise was that the polyurethanes (B) of the invention and the graft copolymers of the invention could be prepared simply and purposively without any damage to the products of the invention. Yet another surprise was the extremely broad usefulness of the polyurethanes (B) of the invention and of the graft copolymers of the invention and their high storage stability even under extreme climatic conditions such as tropical conditions or particularly hot summer's days. Completely impossible to foresee was that, in particular, the graft copolymers of the invention would give aqueous basecoat materials which can be processed with powder clearcoat slurries by the wet-on-wet technique to give outstanding multicoat color and/or effect paint systems without cracking (mud cracking), popping marks or pinholes in the clearcoats or delamination of the clearcoats following the waterjet test.

The polyurethane (B) of the invention contains at least one pendant and/or at least one terminal ethenylarylene group. In other words: the polyurethane (B) of the invention contains at least one pendant, at least one terminal or at least one pendant and at least one terminal ethenylarylene group. In this context the polyurethanes (B) of the invention which contain at least one pendant ethenylarylene group afford particular advantages and are therefore of particular preference in accordance with the invention.

The polyurethane (B) of the invention is hydrophilic or hydrophobic in the sense specified above. In the context of their use for preparing the graft copolymers of the invention, the hydrophilic polyurethanes (B) of the invention afford advantages and are therefore used with preference.

The polyurethane (B) of the invention is obtainable by preparing, in a first process step, a polyurethane prepolymer (B1) that contains at least one free and at least one blocked isocyanate group.

The polyurethane prepolymer (B1) is of linear, branched or comb, but especially linear, construction. The linear polyurethane prepolymer (B1) contains on average preferably two free isocyanate groups, in particular two terminal free isocyanate groups. The branched or comb-constructed polyurethane prepolymers (B1) contain preferably at least two, in particular more than two, free isocyanate groups, terminal free isocyanate groups being preferred.

In the polyurethane prepolymer there are preferably on average at least two, in particular more than two, blocked isocyanate groups. The blocked isocyanate groups are preferably pendant.

Examples of suitable blocking agents are the blocking agents known from the U.S. Pat. No. 4,444,954:

i) phenols such as phenol, cresol, xylenol, nitrophenol, chlorophenol, ethylphenyl, t-butylphenol, hydroxybenzoic acid, esters of this acid or 2,5-di-tert-butyl-4-hydroxy-toluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, aceto-anisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutyl-amine or butylphenylamine;

ix) imidazoles such as imidazole or 2-ethyl-imidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes or ketoximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylo-hydroxamate (BMH) or allyl methacrylo-hydroxamate; or xvi) substituted pyrazoles, ketoximes, imidazoles or triazoles; and also xvii) mixtures of these blocking agents, such as dimethylpyrazole and triazoles, malonates and acetoacetates or dimethylpyrazole and succinimide.

Of these blocking agents, the oximes and ketoximes xiii), especially the ketoximes xiii), more particularly methyl ethyl ketoxime, offer particular advantages and are therefore used with particular preference.

Viewed in terms of its method, the preparation of the polyurethane prepolymers (B1) for inventive use has no special features but instead takes place, for example, as described in patents DE-C-197 22 862, DE-A-196 45 761, EP-A-0 522 419 or EP-A-0 522 420, by reaction of a polyol, particularly a diol, with at least one polyisocyanate, particularly a diisocyanate, the isocyanate component being employed in a molar excess.

Additionally, for the purpose of introducing the blocked isocyanate groups, it is preferred in accordance with the invention here to use at least one compound (B1.1) which contains at least one, especially one, blocked isocyanate group and at least one, especially two, isocyanate-reactive functional groups. Examples of suitable isocyanate-reactive groups are —SH, —NH$_2$, >NH, —OH, —O—(CO)—NH—(CO)—NH$_2$ or —O—(CO)—NH$_2$, of which the primary and secondary amino groups and the hydroxyl group are of advantage and the hydroxyl groups are of particular advantage.

These compounds (B1.1) are preferably prepared by reacting, in a first process step, at least one polyisocyanate, particularly a diisocyanate, with at least one of the above-described monofunctional blocking agents in a molar ratio such that there remains on average at least one, especially one, free isocyanate group in the resultant intermediate.

In a second process step, the intermediate is then reacted with at least one compound containing at least two, in particular two or three, isocyanate-reactive functional groups per molecule. The molar ratio of intermediate to di- or trifunctional compound is chosen here so that one or two isocyanate-reactive functional groups remain in the resultant compound (B1.1).

Examples of suitable polyisocyanates for preparing the compounds (B1.1) are those described below.

Examples of suitable compounds containing two or three isocyanate-reactive functional groups for preparing the compounds (B1.1) are the low molecular mass polyols, polyamines or amino alcohols described below.

The compounds (B1.1) containing one isocyanate-reactive functional group are used in particular for introducing terminal blocked isocyanate groups into the polyurethane prepolymers (B1). The compounds (B1.1) containing two isocyanate-reactive functional groups are used in particular for introducing pendant blocked isocyanate groups into the polyurethane prepolymers (B1), thereby also resulting in an increase in the molecular weight of the polyurethane prepolymers (B1).

For the preparation of the polyurethane prepolymers (B1) it is preferred to use diisocyanates and also, if desired, in minor amounts, polyisocyanates, for the purpose of introducing branches. In the context of the present invention, minor amounts are amounts which do not cause gelling of the polyurethane prepolymers (B1) during their preparation. This may also be prevented by using small amounts of monoisocyanates as well.

Examples of suitable diisocyanates are iso-phorone diisocyanate (i.e., 5-isocyanato-1-isocyanato-methyl-1,3,3-trimethylcyclohexane), 5-isocyanato-1-(2-isocyanatoeth-1-yl)-1,3,3-trimethylcyclohexane, 5-iso-cyanato-1-(3-isocyanatoprop-1-yl)-1,3,3-trimethyl-cyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexa-methylene diisocyanate, ethylethylene diisocyanate, trimethylhexane diisocyanate, heptanemethylene diiso-cyanate or diisocyanates derived from dimeric fatty acids, as marketed under the commercial designation DDI 1410 by the company Henkel and described in patents DO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight, and in particular 20% by weight, as is described in patents DE-A-44 14 032, GB-A-1220717, DE-A-16 18 795 or DE-A-17 93 785; tolylene diisocyanate, xylylene diisocyanate, bisphenylene diisocyanate, naphthylene diisocyanate or diphenylmethane diisocyanate.

Examples of suitable polyisocyanates are the isocyanurates of the diisocyanates described above.

Examples of highly suitable monoisocyanates are phenyl isocyanate, cyclohexyl isocyanate or stearyl isocyanate.

The above-described polyisocyanates may be used with advantage for preparing compounds (B1.1).

For preparing the polyurethane prepolymers (B1) use is further made of saturated and unsaturated polyols of relatively high molecular mass and of low molecular mass, especially diols and, in minor amounts, triols for introducing branches, and also, if desired, compounds which introduce hydrophilic functional groups, polyamines, and amino alcohols.

Examples of suitable polyols are saturated or olefinically unsaturated polyester polyols which are prepared by reacting unsulfonated or sulfonated saturated and/or unsaturated polycarboxylic acids or their esterifiable derivatives, alone or together with monocarboxylic acids, and saturated and/or unsaturated polyols, alone or together with monools.

Examples of suitable polycarboxylic acids are aromatic, aliphatic and cycloaliphatic polycarboxylic acids. Preference is given to the use of aromatic and/or aliphatic polycarboxylic acids.

Examples of suitable aromatic polycarboxylic acids are phthalic acid, isophthalic acid, terephthalic acid, phthalic, isophthalic or terephthalic acid monosulfonate, or halophthalic acids, such as tetrachlorophthalic or tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid, or maleic acid, fumaric acid or itaconic acid, of which adipic acid, glutaric acid, azelaic acid, sebacic acid, dimeric fatty acids and maleic acid are advantageous and are therefore used with preference.

Examples of suitable cycloaliphatic and cyclic unsaturated polycarboxylic acids are 1,2-cyclo-butanedicarboxylic acid, 1,3-cyclobutanedicarboxylic acid, 1,2-cyclopentanedicarboxylic acid, 1,3-cyclo-pentanedicarboxylic acid, hexahydrophthalic acid, 1,3-cyclohexanedicarboxylic acid, 1,4-cyclohexane-dicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Further examples of suitable polycarboxylic acids are polymeric fatty acids, especially those having a dimer content of more than 90% by weight, which are also known as dimer fatty acids.

Also suitable are the esterifiable derivatives of the above-mentioned polycarboxylic acids, such as their monoesters or polyesters with aliphatic alcohols having 1 to 4 carbon atoms or hydroxy alcohols having 1 to 4 carbon atoms, for example. It is also possible to use the anhydrides of the abovementioned polycarboxylic acids, where they exist.

Together with the polycarboxylic acids it is also possible if desired to use monocarboxylic acids, such as, for example, benzoic acid, tert-butylbenzoic acid, lauric acid, isononanoic acid, or fatty acids of naturally occurring oils, and also acrylic acid, methacrylic acid, ethacrylic acid or crotonic acid. A preferred monocarboxylic acid used is isononanoic acid.

Examples of suitable polyols are diols and triols, especially diols. Normally, triols are used alongside the diols in minor amounts in order to introduce branches into the polyester polyols. In the context of the present invention, minor amounts are amounts which do not cause gelling of the polyester polyols during their preparation.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclo-hexanediol, 1,2-, 1,3- or 1,4-cyclohexanedimethanol, trimethylpentanediol, ethylbutylpropanediol or the positionally isomeric diethyloctanediols. These diols may also be used per se for the preparation of the polyurethanes (A) for use in accordance with the invention.

Further examples of suitable diols are diols of the formula IV or V:

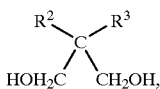

(IV)

where $R^2$ and $R^3$ are each an identical or different radical and are an alkyl radical having 1 to 18 carbon atoms, an aryl radical or a cycloaliphatic radical, with the proviso that $R^2$ and/or $R^3$ must not be methyl;

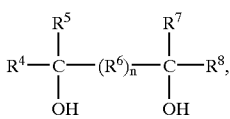

(V)

where $R^4$, $R^5$, $R^7$ and $R^8$ are each identical or different radicals and are an alkyl radical having 1 to 6 carbon atoms, a cycloalkyl radical or an aryl radical and $R^6$ is an alkanediyl radical having 1 to 6 carbon atoms, an arylene radical or an unsaturated alkenediyl radical having 1 to 6 carbon atoms, and n is either 0 or 1.

Suitable diols IV of the general formula IV are all propanediols in which either $R^2$ or $R^3$ or $R^2$ and $R^3$ is not methyl, such as, for example, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethyl-bicyclo[2.2.1]heptane, 2,2-diethyl-1,3-propanediol, 2,2-dipropyl-1,3-propanediol or 2-cyclohexyl-2-methyl-1,3-propanediol, et cetera.

Examples of diols V of the general formula V that may be used are 2,5-dimethyl-2,5-hexanediol, 2,5-diethyl-2,5-hexanediol, 2-ethyl-5-methyl-2,5-hexane-diol, 2,4-dimethyl-2,4-pentanediol, 2,3-dimethyl-2,3-butanediol, 1,4-(2'-hydroxypropyl)benzene and 1,3-(2'-hydroxypropyl)benzene.

Of these diols, hexanediol and neopentyl glycol are particularly advantageous and are therefore used with particular preference.

The abovementioned diols may also be used per se to prepare the polyurethane prepolymers (B1).

Examples of suitable triols are tri-methylolethane, tri-methylolpropane or glycerol, especially trimethylolpropane.

The abovementioned triols may also be used per se to prepare the polyurethane prepolymers (B1) (cf. patent EP-A-0 339 433).

If desired, minor amounts of monools may also be used. Examples of suitable monools are alcohols or phenols such as ethanol, propanol, n-butanol, sec-butanol, tert-butanol, amyl alcohols, hexanols, fatty alcohols, allyl alcohol or phenol.

The polyester polyols may be prepared in the presence of small amounts of a suitable solvent as entrainer. Examples of entrainers used are aromatic hydrocarbons, such as especially xylene and (cyclo)-aliphatic hydrocarbons, e.g., cyclohexane or methyl-cyclohexane.

Further examples of suitable polyols are polyester diols which are obtained by reacting a lactone with a diol. They are notable for the presence of terminal hydroxyl groups and repeating polyester fractions of the formula —(—CO—(CHR$^9$)$_m$—CH$_2$—O—) Here, the index m is preferably from 4 to 6 and the substituent $R^9$ is hydrogen or an alkyl, cycloalkyl, or alkoxy radical. No substituent contains more than 12 carbon atoms. The total number of carbon atoms in the substituent does not exceed 12 per lactone ring. Examples are hydroxycaproic acid, hydroxybutyric acid, hydroxydecanoic acid and/or hydroxystearic acid.

Preferred for the preparation of the polyester diols is the unsubstituted ε-caprolactone, where m is 4 and all substituents $R^9$ are hydrogen. The reaction with lactone is started by low molecular mass polyols such as ethylene glycol, 1,3-propanediol, 1,4-butanediol, or dimethylolcyclohexane. It is also possible, however, to react other reaction components, such as ethylenediamine, alkyldialkanolamines, or else urea, with caprolactone. Other suitable diols of relatively high molecular mass are polylactam diols, which are prepared by reacting, for example, ε-caprolactam with low molecular mass diols.

Further examples of suitable polyols include polyether polyols, especially those having a number-average molecular weight of from 400 to 5000, in particular from 400 to 3000. Examples of highly suitable polyether diols are polyether diols of the. general formula H—(—O—(CHR$^{10}$)$_o$—)$_p$OH, where the substituent $R^{10}$ is hydrogen or a lower, unsubstituted or substitued alkyl radical, the index o is from 2 to 6, preferably from 3 to 4, and the index p is from 2 to 100, preferably from 5 to 50. Especially suitable examples are linear or branched polyether diols such as poly(oxyethylene) glycols, poly(oxypropylene) glycols, and poly(oxybutylene) glycols.

By means of the polyether diols it is possible to introduce nonionic hydrophilic functional groups (b3) into the main chain(s) of the polyurethane prepolymers (B1).

The above-described polyols of low molecular mass may be used with advantage for preparing compounds (B1.1).

Hydrophilic polyurethane prepolymers (B1) comprise alternatively (b1) hydrophilic functional groups convertible into cations by neutralizing agents and/or quaternizing agents, and/or cationic groups, especially ammonium groups, or (b2) functional groups convertible into anions by neutralizing agents, and/or anionic groups, especially carboxylic acid and/or carboxylate groups, and/or (b3) nonionic hydrophilic groups, especially poly(alkylene ether) groups.

Examples of suitable functional groups (b1) for use in accordance with the invention and convertible into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (b1) for use in accordance with the invention are primary, secondary, tertiary or quaternary ammonium groups, tertiary sulfonium groups or quaternary phosphonium groups, preferably quaternary ammonium groups or quaternary ammonium groups, tertiary sulfonium groups, but especially tertiary sulfonium groups.

Examples of suitable functional groups (b2) for use in accordance with the invention and convertible into anions by neutralizing agents are carboxylic acid, sulfonic acid or phosphonic acid groups, especially carboxylic acid groups.

Examples of suitable anionic groups (b2) for use in accordance with the invention are carboxylate, sulfonate or phosphonate groups, especially carboxylate groups.

Examples of suitable neutralizing agents for functional groups (b1) convertible into cations are organic and inorganic acids such as formic acid, acetic acid, lactic acid, dimethylolpropionic acid, citric acid, sulfuric acid, hydrochloric acid or phosphoric acid.

Examples of suitable neutralizing agents for functional groups (b2) convertible into anions are ammonia or amines, such as trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine or triethanolamine, for example. Neutralization may take place in organic phase or in aqueous phase. A preferred neutralizing agent used is dimethylethanolamine and/or triethylamine.

The introduction of hydrophilic functional (potentially) cationic groups (b1) into the polyurethane prepolymers (B1) takes place by way of the incorporation of compounds which contain in the molecule at least one, especially two, isocyanate-reactive groups and at least one group capable of forming cations; the amount to be used may be calculated from the target amine number.

Suitable isocyanate-reactive groups are those described above, in particular hydroxyl groups and also primary and/or secondary amino groups, of which the hydroxyl groups are preferably used.

Examples of suitable compounds of this kind are 2,2-dimethylolethyl- or -propylamine blocked with a ketone, the resultant ketoxime group being hydrolyzed again prior to the formation of the cationic group (b1), or N,N-dimethyl-, N,N-diethyl- or N-methyl-N-ethyl-2,2-dimethylolethyl- or -propylamine.

The introduction of hydrophilic functional (potentially) anionic groups (b2) into the polyurethane prepolymers (B1) takes place by way of the incorporation of compounds which contain in the molecule at least one isocyanate-reactive group and at least one group capable of forming anions; the amount to be used may be calculated from the target acid number.

Examples of suitable compounds of this kind are those containing two isocyanate-reactive groups in the molecule. Suitable isocyanate-reactive groups are in particular hydroxyl groups, and primary and/or secondary amino groups. Accordingly it is possible, for example, to use alkanoic acids having two substituents on the α carbon atom. The substituent may be a hydroxyl group, an alkyl group, or, preferably, an alkylol group. These alkanoic acids have at least one, generally from 1 to 3, carboxyl groups in the molecule. They have 2 to about 25, preferably 3 to 10, carbon atoms. Examples of suitable alkanoic acids are dihydroxypropionic acid, dihydroxysuccinic acid, and dihydroxybenzoic acid. A particularly preferred group of alkanoic acids are the α,α-dimethylolalkanoic acids of the general formula $R^{11}$—C(CH$_2$OH)$_2$COOH, $R^{11}$ being a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimethylolpentanoic acid. The preferred dihydroxyalkanoic acid is 2,2-dimethylolpropionic acid. Examples of compounds containing amino groups are α,α-diaminovaleric acid, 3,4-diaminobenzoic acid, 2,4-diaminotoluenesulfonic acid, and 2,4-diaminodiphenyl ether sulfonic acid.

Hydrophilic functional nonionic poly(oxyalkylene) groups (b3) may be introduced as lateral or terminal groups into the polyurethane molecules. For this purpose it is possible to use not only the above-described polyether diols but also, for example, alkoxypoly(oxyalkylene) alcohols having the general formula $R^{12}$O—(—CH$_2$—CHR$^{13}$—O—)$_r$H, where $R^{12}$ is an alkyl radical having 1 to 6 carbon atoms, $R^{13}$ is a hydrogen atom or an alkyl radical having 1 to 6 carbon atoms, and the index r is a number between 20 and 75 (cf. patents EP-A-0 354 261 or EP-A-0 424 705).

The hydrophilic functional groups (b1) or (b2) are to be selected so as to rule out the possibility of any disruptive reactions, such as, for instance, salt formation or crosslinking with the functional groups that may be present in the other constituents of the polyurethane (B), of the graft copolymers, of the coating material, of the sealing compound, or of the adhesive of the invention. The skilled worker will therefore be able to make the selection in a simple manner on the basis of his or her knowledge in the art.

Of these hydrophilic functional (potentially) ionic groups (b1) and (b2) and the hydrophilic functional nonionic groups (b3), the (potentially) anionic groups (b2) are advantageous and are therefore used with particular preference.

For preparing the hydrophilic and the hydrophobic polyurethane prepolymers (B1) it is possible to use polyamines and amino alcohols which bring about an increase in the molecular weight of the polyurethane prepolymers (B1). Here it is essential that the polyamines and amino alcohols are employed in an amount such that free isocyanate groups still remain in the molecule.

Examples of suitable polyamines have at least two primary and/or secondary amino groups. Polyamines are essentially alkylenepolyamines having 1 to 40 carbon atoms, preferably about 2 to 15 carbon atoms. They may carry substituents which have no hydrogen atoms that are reactive with isocyanate groups. Examples are polyamines having a linear or branched aliphatic, cycloaliphatic or aromatic structure and at least two primary amino groups.

Diamines include hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,4'-diaminodicyclohexylmethane, and aminoethylenothanolamine. Preferred diamines are hydrazine, alkyl- or cycloalkyldiamines such as propylenediamine and 1-amino-3-aminomethyl-3,5,5-trimethylcyclohexane.

It is also possible to use polyamines containing more than two amino groups in the molecule. In these cases, however, it should be ensured—for example, by using monoamines as well—that no crosslinked polyurethane resins are obtained. Polyamines of this kind which may be used are diethylenetriamine, triethylenetetramine, dipropylenediamine, and dibutylenetriamine. An example of a monoamine that may be mentioned is ethylhexylamine (cf. patent EP-A-0 089 497). The polyamines may also be used with advantage for preparing the compounds (B1.1).

Examples of suitable amino alcohols are ethanolamine, diethanolamine or triethanolamine. The amino alcohols may also be used with advantage for preparing the compounds (B1.1).

Furthermore, to prepare the hydrophilic and hydrophobic polyurethane prepolymers (B1) it is possible to use customary and known compounds by means of which olefinically unsaturated groups are introduced. As is known, such compounds contain at least two isocyanate-reactive functional groups, especially hydroxyl groups, and at least one olefinically unsaturated group. Examples of suitable compounds of this kind are known from patents DE-C-197 22 862, DE-A-196 45 761, EP-A-0 522 419 or EP-A-0 522 420.

Preparation of the polyurethanes (B) of the invention comprises, in a second process step, preparing at least one adduct (B2).

The adduct (B2) for inventively preferred use is obtainable by reacting at least one ethenylarylene monoisocyanate with at least one polyol, polyamine and/or at least one compound containing at least one hydroxyl group and at least one amino group, in such a way that at least one isocyanate-reactive functional group remains in the adduct (B2).

This means that the ethenylarylene mono-isocyanate is reacted with (i) compounds containing two isocyanate-reactive groups, e.g., a diol, diamine and/or alkanolamine, in a molar ratio of from 0.8:1 to '1.2:1, especially 1:1;

(ii) compounds containing three isocyanate-reactive groups; for example, a triol, triamine, alkanol-diamine, dialkanolamine and/or trialkanolamine, in a molar ratio of from 0.8:1 to 2.2:1, preferably from 1:1 to 2:1, especially 1:1 or 2:1, to give adducts (B2) containing one or two ethenylarylene groups; or (iii) compounds containing four isocyanate-reactive groups, e.g., a tetrol, tetraamine, alkanoltriamine, dialkanoldiamine and/or trialkanolamine in a molar ratio of from 0.8:1 to 3.2:1, preferably from 1:1 to 3:1, especially 1:1, 2:1 or 3:1, to give adducts (B2) containing from 1 to 3 ethenylarylene groups.

Inventively preferred ethenylarylene monoisocyanates are those of the general formula I

CH$_2$=C(R)—A—X—NCO　　　(I)

in which the variables have the following meanings:

A=substituted or unsubstituted C$_6$–C$_{20}$ arylene radical;

R=hydrogen atom, a halogen atom, a nitrile group, a substituted or unsubstituted alkyl, cycloalkyl, alkylcycloalkyl, cycloalkylalkyl, aryl, alkylaryl, cycloalkylaryl arylalkyl or arylcycloalkyl radical; and X=divalent organic radical.

Examples of suitable arylene radicals A are 1,2-, 1,3- or 1,4-phenylene, 1,2-, 1,3-, 1,4-, 1,5-, 1,6-, 1,7-, 1,8-, 2,3-, 2,4-, 2,5-, 2,6- or 2,7-naphthylene, 1,2'-, 1,3'-, 1,4'-, 2,2'-, 2,3'-, 2,4'- or 2,5'-biphenylylene or 1,4-phenanthrenylene, especially 1,2-, 1,3- or 1,4-phenylene.

Of these, the phenylene, naphthylene and biphenylylene radicals A are of advantage and are therefore used with preference in accordance with the invention. Particular advantages are afforded by the phenylene radicals A, especially the 1,3-phenylene radical A, which accordingly is used with very particular preference in accordance with the invention.

Examples of suitable alkyl radicals R are methyl, ethyl, propyl, isopropyl, n-butyl, iso-butyl, tert-butyl, amyl, hexyl, heptyl, octyl, 2-ethylhexyl, isooctyl, nonyl, decyl, undecyl, dodecyl, tridecyl, tetradecyl, pentadecyl, hexadecyl, heptadecyl, octadecyl, nonadecyl or eicosanyl.

Examples of suitable cycloalkyl radicals R are cyclobutyl, cyclopentyl, cyclobutyl, cyclopentyl, cyclohexyl, bicyclo[2.2.1]heptayl, bicyclo[3.2.1]octyl or tricyclodecyl.

Examples of suitable alkylcycloalkyl radicals R are methylenecyclohexane, ethylenecyclohexane or propane-1,3-diyl-cyclohexane.

Examples of suitable cycloalkylalkyl radicals R are 2-, 3- or 4-methyl-, -ethyl-, -propyl- or -butylcyclohex-1-yl.

Examples of suitable aryl radicals R are phenyl, naphthyl or biphenylyl.

Examples of suitable alkylaryl radicals R are benzyl-, ethylene- or propane-1,3-diyl-benzene.

Examples of suitable cycloalkylaryl radicals R are 2-, 3-, or 4-phenylcyclohex-1-yl.

Examples of suitable arylalkyl radicals R are 2-, 3- or 4-methyl-, -ethyl-, -propyl- or -butylphen-1-yl.

Examples of suitable arylcycloalkyl radicals R are 2-, 3- or 4-cyclohexylphen-1-yl.

Of these radicals R it is hydrogen atoms and alkyl groups R, especially methyl groups, which are of advantage and are therefore used with preference in accordance with the invention. Of particular advantage in terms of the grafting activity of the ethenyl group are methyl groups, which are therefore used with very particular preference in accordance with the invention.

The radicals A and R described above, where they are not hydrogen atoms, halogen atoms or nitrile groups, may be substituted. For this purpose it is possible to use electron withdrawing or electron donating atoms or organic radicals.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; and tertiary amino groups, especially N,N-dimethylamino, N,N-diethylamino, N,N-dipropylamino, N,N-diphenylamino, N,N-dicyclohexylamino, N-cyclohexyl-N-methylamino or N-ethyl-N-methylamino. Suitable substituents are to be selected such that any unwanted interaction such as salt formation or crosslinking with the hydrophilic groups that may be present in the polyurethane (B) of the invention or present in the graft copolymers of the invention cannot take place. The skilled worker is therefore able to select suitable substituents in a simple manner.

In accordance with the invention, unsubstituted radicals A and R are of advantage and are therefore used with particular preference.

In the general formula I, the variable X stands for a divalent organic radical which preferably derives from the following compounds:

(i) substituted and unsubstituted, linear or branched alkanes, alkenes, cycloalkanes, cycloalkenes, alkylcycloalkanes, alkylcycloalkenes, alkenylcycloalkanes or alkenylcycloalkenes containing no heteroatom or at least one heteroatom in the chain and/or in the ring;

(ii) substituted and unsubstituted aromatics or heteroaromatics; and (iii) alkyl-, alkenyl-, cycloalkyl-, cycloalkenyl-, alkylcycloalkyl-, alkylcycloalkenyl-, alkenylcycloalkyl- or alkenylcycloalkenyl-substituted aromatics or heteroaromatics whose substituents are substituted or unsubstituted and contain no heteroatom or at least one heteroatom in their chain and/or their ring.

Examples of suitable heteroatoms are oxygen, nitrogen, boron, silicon, sulfur or phosphorus atoms.

Examples of suitable substituents are the substituents mentioned above, for whose selection the comments made above are to be observed.

Examples of suitable aromatics are benzene and naphthalene.

Examples of suitable heteroaromatics are thiophene, pyridine or triazine.

Examples of suitable alkanes are branched or unbranched alkanes having preferably from 1 to 10, in particular from 3 to 6, carbon atoms in the molecule such as methane ethane, propane, butane, isobutane, pentane, neopentane, hexane, heptane, octane, isooctane, nonane or dececane.

Examples of suitable alkenes are ethylene and propylene.

Examples of suitable cycloalkanes are cyclopentane and cyclohexane.

Examples of suitable cycloalkenes are cyclopentene and cyclohexene.

Examples of suitable alkylcycloalkanes are methylcyclopentane and methylcyclohexane.

Examples of suitable alkylcycloalkenes are methylcyclopentene and methylcyclohexene.

Examples of suitable alkenylcycloalkanes are allyl- and vinylcyclopentane and allyl- and vinylcyclohexane.

Examples of suitable alkenylcycloalkenes are vinylcyclopentene and vinylcyclohexene.

Examples of suitable alkyl, alkenyl, cycloalkyl, cycloalkenyl, alkylcycloalkyl, alkylcycloalkenyl, alkenylcloalkyl or alkenylcycloalkenyl substituents are methyl, ethyl, propyl, isopropyl, n-butyl, sec-butyl, tert-butyl, vinyl, allyl, cyclohexyl, cyclohexenyl, 4-methylcyclohexyl, 4-methylcyclohexenyl, 3-allylcyclohexenyl or 4-vinylcyclohexenyl.

The radicals X preferably derive from organic compounds which per se are unsubstituted or whose substituents are unsubstituted.

With particular preference the radicals X are alkanediyl radicals having from 3 to 6 carbon atoms in the molecule, especially the alkanediyl radical $—C(CH_3)_2—$.

Among the ethenylarylene monoisocyanates I, 1-(1-isocyanato-1-methylethyl)-3-(1-methylethenyl)-benzene has very particular advantages in terms of reaction to give the desired adduct (B2) and in terms of the grafting activity of the polyurethanes (B) of the invention and is therefore used with very particular preference in accordance with the invention. 1-(1-Isocyanato-1-methylethyl)-3-(1-methylethenyl)benzene is a known compound and is available under the brand name TMI® from the company CYTEC.

Examples of suitable polyols, polyamines and compounds containing at least one hydroxyl group and at least one amino group are the compounds described above in connection with the description of the polyurethane prepolymer (B1), and also the higher polyols pentaerythritol or homopentaerythritol or sugar alcohols such as threitol, erythritol, arabitol, adonitol, xylitol, sorbitol, mannitol or dulcitol.

Of these compounds, ethanolamine and diethanolamine offer very particular advantages and are therefore used with very particular preference in accordance with the invention. When using ethanolamine this results in an adduct (B2) which contains one isocyanate-reactive functional group and one urethane group or one urea group (variant i). When using diethanolamine in a 1:1 molar ratio an adduct (B2) results which contains two isocyanate-reactive functional groups and one urethane group or one urea group (variant ii). This difunctional adduct (B2) is outstandingly suitable for preparing pendant ethenylarylene groups. At the same time, an increase in the molecular weight of the polyurethanes (B) of the invention can be achieved by this means.

The preparation of the adducts (B2) for use in accordance with the invention has no special features in terms of its method but instead takes place by the reaction of the above-described starting products in an inert organic medium, preferably in polar organic solvents such as ketones, especially methyl ethyl ketone, or amides, especially N-methylpyrrolidone, which contain no functional groups which react with isocyanate groups. It is important that the reaction takes place until free isocyanate groups can no longer be detected in the reaction mixture.

The preparation of the polyurethanes (B) of the invention from the above-described polyurethane prepolymers (B1) and from the adducts (B2) likewise has no special features in terms of its method but instead takes place without solvent or in an inert organic medium, preferably in an inert organic medium, in which context the polar organic solvents described above are employed with preference. It is important that the reaction takes place to constant free-isocyanate-group content or until free isocyanate groups can no longer be detected in the reaction mixture. Where free isocyanate groups are still present, they are blocked, according to the invention, with the above-described blocking agents, preference being given here also to using the ketoximes xiii).

The ethenylarylene group content of the polyurethanes (B) of the invention may vary very widely. It is preferably from 0.01 to 30%, more preferably from 0.1 to 25%, with particular preference from 0.2 to 20%, with very particular preference from 0.25 to 15%, and in particular from 0.3 to 10% by weight, based in each case on the polyurethane (B) of the invention.

The blocked isocyanate group content of the polyurethanes (B) of the invention may also vary very widely. It is preferably from 0.01 to 30%, more preferably from 0.1 to 25%, with particular preference from 0.2 to 20%, with very particular preference from 0.25 to 15%, and in particular from 0.3 to 10% by weight, based in each case on the polyurethane (B) of the invention.

Particularly advantageous hydrophilic or hydrophobic polyurethanes (B) of the invention here contain on average per molecule
  at least one, preferably 1 to 2 and in particular 1 to 3 pendant,
  at least one, preferably 1 to 2 and in particular 1 to 3 terminal, or
  at least one pendant and at least one terminal, preferably 1 to 2 pendant and 1 to 2 terminal,
blocked isocyanate groups.

Particularly advantageous hydrophilic or hydrophobic polyurethanes (B) of the invention here contain on average per molecule at least one, preferably 1 to 2 and in particular 1 to 3 pendant, at least one, preferably 1 to 2 and in particular 1 to 3 terminal, or at least one pendant and at least one terminal, preferably 1 to 2 pendant and 1 to 2 terminal, ethenylarylene groups of the general formula II:

$$CH_2=C(R)-A- \qquad (II)$$

In the general formula II, the variables R and A have the meanings detailed above.

In accordance with the invention, the ethenylarylene groups of the general formula II are joined to the polyurethane main chain by way of a linking radical III. This linking radical III is a divalent or trivalent radical.

Examples of highly suitable linking radicals III are those of the general formula IIIa to IIIc:

$$-X-NH-C(O)-O- \qquad (IIIa),$$

$$-X-NH-C(O)-NH- \qquad (IIIb) \text{ or}$$

$$-X-NH-C(O)-N< \qquad (IIIc).$$

In these formulae, the variable X has the meaning detailed above in connection with the general formula I. With particular preference the linking radical IIIc serves for linking the pendant ethenylarylene groups I to the polymer main chain, with the tertiary nitrogen atom being part of the polymer main chain.

The polyurethanes (B) of the invention may be used per se for preparing coating materials, especially surface coating materials, adhesives, and sealing compounds.

Where the polyurethanes (B) of the invention are hydrophilic, it is of advantage in accordance with the invention to use them in the form of a dispersion in an aqueous medium. The aqueous medium contains essentially water. The aqueous medium may include minor amounts of organic solvents, neutralizing agents, crosslinking agents and/or customary coatings additives and/or other dissolved solid, liquid or gaseous, organic and/or inorganic, low and/or high molecular mass substances. In the context of the present invention, the term "minor amount" refers to an amount which does not take away the aqueous nature of the aqueous medium. The aqueous medium may alternatively comprise straight water.

For the purpose of dispersion, the hydrophilic polyurethanes (B) of the invention which contain the above-described (potentially) ionic hydrophilic functional groups (b1) or (b2) are neutralized with at least one of the above-described neutralizing agents and then dispersed. In the case of the hydrophilic polyurethanes (B) of the invention which contain only the nonionic hydrophilic functional groups (b3), the use of neutralizing agents is unnecessary.

The resultant polyurethane dispersions (B) of the invention are likewise outstandingly suitable for preparing aqueous coating materials, adhesives, and sealing compounds. They are particularly suitable for preparing the graft copolymers of the invention.

The graft copolymers of the invention are preparable, according to a first advantageous variant, by dispersing at least one hydrophilic polyurethane (B) of the invention in an aqueous medium, after which a mixture of at least one monomer (a1) containing at least one isocyanate-reactive functional group and at least one monomer (a2) copolymerizable therewith is free-radically (co)polymerized in emulsion in its presence.

According to a second advantageous variant, the graft copolymers of the invention are preparable by dispersing at least one hydrophobic polyurethane (B) of the invention in an aqueous medium. Advantageously, this is carried out within a strong shear field. Viewed in terms of its method, this process has no special features but can instead take place, for example, in accordance with the dispersion processes described in European patent application EP-A-0 401 565. Accordingly, a mixture of at least one monomer (a1) containing at least one isocyanate-reactive functional group and at least one monomer (a2) copolymerizable therewith is free-radically (co)polymerized in emulsion in the presence of the dispersed polyurethane (B) of the invention. In accordance with the invention it is of advantage for this variant if the monomer (a2) contains at least one of the above-described hydrophilic functional groups. As regards the selection of the hydrophilic functional groups, the comments made above apply.

As isocyanate-reactive functional groups it is preferred to use those described above.

Examples of monomers (a1) suitable for preparing the graft copolymers of the invention are the following:

hydroxyalkyl esters of acrylic acid, methacrylic acid or another alpha,beta-ethylenically unsaturated carboxylic acid which are derived from an alkylene glycol which is esterified with the acid, or are obtainable by reacting the acid with an alkylene oxide, especially hydroxyalkyl esters of acrylic acid, methacrylic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis(hydroxymethyl)cyclohexane, octahydro-4,7-methano-1H-indenedimethanol or methylpropanediol monoacrylate, monomethacrylate, monoethacrylate or monocrotonate; or reaction products of cyclic esters, such as epsilon-caprolactone, for example, and these hydroxyalkyl esters;

olefinically unsaturated alcohols such as allyl alcohol, 4-hydroxybutyl vinyl ether or polyols such as trimethylolpropane monoallyl or diallyl or divinyl ether or pentaerythritol monoallyl, diallyl or triallyl or divinyl or trivinyl ether;

reaction product of acrylic acid and/or methacrylic acid with the glycidyl ester of an alpha-branched monocarboxylic acid having 5 to 18 carbon atoms per molecule. The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic® acid. This glycidyl ester is obtainable commercially under the name Cardura® E10. For further details, refer to Römpp Lexikon Lacke und Druckfarben, Georg Thieme Verlag, Stuttgart, N.Y., 1998, pages 605 and 606;

(meth)acrylamides such as (meth)acrylamide, N-methyl-, N-ethyl-, N-propyl-, N-butyl-, N-cyclohexyl-, N-methylol-, N,N-dimethylol-, N-methoxymethyl- and/or N-methoxybutyl(meth)acrylamide; these monomers may also be used as monomers (a2) containing hydrophilic functional groups. To this end they are neutralized with the above-described neutralizing agents or reacted with quaternizing agents.

The aforementioned monomers (a1) of higher functionality are generally used only in minor amounts. In the context of the present invention, minor amounts of higher-functional monomers (a1) here are amounts which do not result in the crosslinking or gelling of the grafted-on (meth)acrylate copolymers (A). Thus, the proportion of trimethylolpropane monoallyl ether may be from 2 to 10% by weight, based on the overall weight of the monomers (a1) and (a2) used to prepare the (meth)acrylate copolymer (A).

Examples of monomers (a2) suitable for preparing the graft copolymers of the invention are the following:

(meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl esters or oxacycloalkyl esters such as ethyltriglycol (meth)acrylate and methoxyoligoglycol (meth)acrylate having a molecular weight Mn of preferably 550; or other ethoxylated and/or propoxylated hydroxyl-free (meth)acrylic acid derivatives. These may include, in minor amounts, higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. In the context of the present invention, minor amounts of higher-functional monomers (a2) here are amounts which do not cause crosslinking or gelling of the polyacrylate resins.

Ethylenically unsaturated monomers which carry at least one acid group, preferably a carboxyl group, per molecule, or a mixture of such monomers. It is particularly preferred to use acrylic acid and/or methacrylic acid. It is also possible, however, to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated sulfonic or phosphonic acids or their partial esters. Further suitable monomers include mono(meth)acryloyloxyethyl maleate, succinate, and phthalate.

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products from paraffinic hydrocarbons, such as mineral oil fractions, and may contain both branched and straight-chain acyclic and/or cycloaliphatic olefins. In the reaction of such olefins with formic acid and/or with carbon monoxide and water, a mixture of carboxylic acids is formed in which the carboxyl groups are located predominantly on a quaternary carbon atom. Other olefinic starting materials are, for example, propylene trimer, propylene tetramer, and diisobutylene. Alternatively, the vinyl esters may be prepared in a conventional manner from the acids, for example, by reacting the acid with acetylene. Particular preference—owing to their ready availability—is given to the use of vinyl esters of saturated aliphatic monocarboxylic acids having 9 to 11 carbon atoms and being branched on the alpha carbon atom.

Olefins such as ethylene, propylene, 1-butene, 1-pentene, 1-hexene, cyclohexene, cyclopentene, norbornene, butadiene, isoprene, cyclopentadiene and/or dicyclopentadiene;

monomers containing epoxide groups, such as the glycidyl esters of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methylstyrene, arylstyrenes, in particular diphenyl-ethylene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are marketed under the brand name VeoVa® by the company Deutsche Shell Chemie (for further details, refer to Römpp Lexikon Lacke und Druckfarben, Georg Thieme Verlag, Stuttgart, New York, 1998, page 598 and also pages 605 and 606), and/or the vinyl ester of 2-methyl-2-ethylheptanoic acid.

Polysiloxane macromonomers having a number-average molecular weight Mn of from 1000 to 40,000, preferably from 2000 to 20,000, with particular preference from 2500 to 10,000, and in particular from 3000 to 7000, and having on average from 0.5 to 2.5, preferably from 0.5 to 1.5, ethylenically unsaturated double bonds per molecule, as are described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823 or in international patent application WO 92/22615 on page 12 line 18 to page 18 line 10, or acryloyloxysilane-containing vinyl monomers, preparable by reacting hydroxy-functional silanes with epichlorohydrin and then reacting the reaction product with methacrylic acid and/or hydroxyalkyl esters of (meth)acrylic acid.

From these suitable monomers (a1) and (a2) described above by way of example, the skilled worker is easily able to select, on the basis of their known physicochemical properties and reactivities, the hydrophilic or hydrophobic monomers (a1) and (a2) that are particularly suitable for the intended use in question. If desired, he or she may for this purpose onduct a few preliminary rangefinding experiments. In articular, he or she will be careful to ensure that the monomers (a1) and (a2) contain no functional groups, especially (potentially) ionic functional groups, which enter into unwanted interactions with other (potentially) ionic functional groups present, for example, in the hydrophilic polyurethanes (B) of the invention.

In accordance with the invention, particular advantages result if the monomers (a1) and (a2) are selected such that the profile of properties of the grafted-on (co)polymers is determined essentially by the above-described hydrophilic or hydrophobic (meth)acrylate monomers (a1) and (a2), the other monomers (a1) and (a2) advantageously providing broad variation of this profile of properties.

Viewed in terms of method, the preparation of the graft copolymers of the invention has no special features but instead takes place in accordance with the customary and known methods of free-radical emulsion polymerization in the presence of at least one polymerization initiator, such as is described, for example, in patents DE-C-197 22 862, DE-A-196 45 761, EP-A-0 522 419 or EP-A-0 522 420.

The monomers (a1) and (a2) here may also be brought, with the aid of a portion of a polyurethane dispersion (B) of the invention and water, into the form of a preemulsion, which is then slowly metered into an initial charge in which the actual emulsion polymerization proceeds.

Examples of suitable polymerization initiators are initiators which form free radicals, such as dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate, or tert-butyl per-2-ethylhexanoate; potassium, sodium or ammonium peroxodisulfate; azo dinitriles such as azobisisobutyronitrile; C—C-cleaving initiators such as benzpinacol silyl ethers; or a combination of a nonoxidizing initiator with hydrogen peroxide. Water-insoluble initiators are preferably used. The initiators are used preferably in an amount of from 0.1 to 25% by weight, with particular preference from 0.75 to 10% by weight, based on the overall weight of the monomers (a1) and (a2).

In the aqueous emulsions the monomers (a1) and (a2) are then polymerized with the aid of the abovementioned free-radical initiators at temperatures from 0 to 95° C., preferably 40 to 95° C., and, when using redox systems, at temperatures from 30 to 70° C. When operating under superatmospheric pressure the polymerization may also be conducted at temperatures above 100° C.

It is preferred to commence the addition of initiator some time, generally from about 1 to 15 minutes, before the addition of the monomers (a1) and (a2). Preference is further given to a process in which the addition of initiator is commenced at the same point in time as the addition of the monomers (a1) and (a2) and is ended about half an hour after the addition of the monomers (a1) and (a2) has been ended. The initiator is preferably added in a constant amount per unit time. After the end of the addition of initiator, the reaction mixture is held at polymerization temperature until (generally 1.5 hours) all of the monomers (a1) and (a2) used have undergone substantially complete reaction. "Substantially complete reaction" is intended to denote that preferably 100% by weight of the monomers (a1) and (a2) used have undergone reaction but that it is also possible for a small residual monomer content of not more than up to about 0.5% by weight, based on the weight of the reaction mixture, to remain unreacted.

Suitable reactors for the graft copoly-merization include the customary and known stirred tanks, stirred tank cascades, tube reactors, loop reactors or Taylor reactors, as are described, for example, in patents DE-B-1 071 241 or EP-A-0 498 583 or in the article by K. Kataoka in Chemical Engineering Science, Volume 50, No. 9, 1995, pages 1409 to 1416.

The quantitative ratio of core to shell in the graft copolymers of the invention may vary extremely widely, which is a particular advantage of the graft copolymers of the invention. Preferably this ratio is from 1:100 to 100:1, more preferably from 1:50 to 50:1, with particular preference from 30:1 to 1:30, with very particular preference from 20:1 to 1:20, and in particular from 10:1 to 1:10. Very particular advantages result if this ratio is approximately 3.5:1 to 1:3.5, in particular 1.5:1 to 1:1.5.

In the case of the inventively preferred use of (potentially) anionic hydrophilic functional groups (b2), especially carboxylic acid groups, further particular advantages result if in the graft copolymers of the invention the ratio of acid number of the shell to acid number of the core is >1, preferably >3, more preferably >5, with particular preference >7, with very particular preference >9, and in particular >10.

The graft copolymers of the invention may be isolated from the primary dispersions in which they are produced and may be put to any of a wide variety of end uses, especially in solventborne, water- and solvent-free pulverulent solid or water- and solvent-free liquid coating materials, adhesives, and sealing compounds. In accordance with the invention, however, it is of advantage to use the primary dispersions as they are for preparing aqueous coating materials, adhesives, and sealing compounds.

Besides the polyurethanes (B) of the invention and the graft copolymers of the invention, the aqueous adhesives of the invention may comprise further suitable customary and known constituents in effective amounts. Examples of suitable constituents are the crosslinking agents and additives described below, provided they are suitable for preparing adhesives.

Besides the polyurethanes (B) of the invention and the graft copolymers of the invention, the aqueous sealing compounds of the invention may likewise comprise further suitable customary and known constituents in effective amounts. Examples of suitable constituents are the crosslinking agents and additives described below, provided they are likewise suitable for preparing sealing compounds.

The primary dispersions of the graft copolymers of the invention are suitable primarily for preparing the aqueous coating materials of the invention, especially the aqueous surface coating materials of the invention. Examples of aqueous surface coating materials of the invention are surfacers, solid-color topcoat materials, aqueous basecoat materials, and clearcoat materials. The primary dispersions of the invention display very particular advantages when used for preparing the aqueous basecoat materials of the invention.

In the aqueous basecoat materials of the invention, the polyurethanes (B) and/or the graft copolymers of the invention, but especially the graft copolymers of the invention, are present advantageously in an amount of from 1.0 to 50%, preferably from 2.0 to 40%, with particular preference from 3.0 to 35%, with very particular preference from 4.0 to 30%, and in particular from 5.0 to 25% by weight, based in each case on the overall weight of the respective aqueous basecoat material of the invention.

The further essential constituent of the aqueous basecoat material of the invention is at least one color and/or effect pigment. The pigments may consist of organic or inorganic compounds. On the basis of this large number of suitable pigments, therefore, the aqueous basecoat material of the invention ensures a universal scope for use and permits the realization of a large number of color shades and optical effects.

Effect pigments which can be used include metal flake pigments such as commercial aluminum bronzes, the chromated aluminum bronzes of DE-A-36 36 183, commercial stainless steel bronzes, and nonmetallic effect pigments, such as pearlescent pigments and interference pigments, for example. For further details refer to Römpp Lexikon Lacke und Druckfarben, Georg Thieme, Verlag, 1998, page 176, "Effect pigment's" and pages 380 and 381 "Metal oxide-mica pigments" to "Metal pigments".

Examples of suitable inorganic color pigments are titanium dioxide, iron oxides, Sicotrans yellow, and carbon black. Examples of suitable organic color pigments are thioindigo pigments indanthrene blue, Cromophthal red, Irgazine orange and Heliogen green. For further details refer to Römpp Lexikon Lacke und Druckfarben, Georg Thieme Verlag, 1998, pages 180 and 181, "Iron blue pigments" to "Black iron oxide", pages 451 to 453 "Pigments" to "Pigment volume concentration", page 563 "Thioindigo pigments" and page 567 "Titanium dioxide pigments".

The fraction of the pigments in the aqueous basecoat material of the invention may vary extremely widely and is guided in particular by the opacity of the pigments, the desired shade, and the desired optical effect. In the aqueous basecoat material of the invention the pigments are present in an amount of preferably from 0.5 to 50%, more preferably from 0.5 to 45%, with particular preference from 0.5 to 40%, with very particular preference from 0.5 to 35%, and in particular from 0.5 to 30% by weight, based in each case on the overall weight of the aqueous basecoat material of the invention. The pigment/binder ratio, i.e., the ratio of the pigments to the polyurethanes (B) of the invention and/or to the graft copolymers of the invention, and also any other binders that may be present, may vary extremely widely. This ratio is preferably from 6.0:1.0 to 1.0:50, more preferably from 5:1.0 to 1.0:50, with particular preference from 4.5:1.0 to 1.0:40, with very particular preference from 4:1.0 to 1.0:30, and in particular from 3.5:1.0 to 1.0:25.

These pigments may also be incorporated into the aqueous basecoat materials of the invention by way of pigment pastes, in which case suitable grinding resins include the polyurethanes (B) and/or the graft copolymers of the invention.

The coating material of the invention, especially of the aqueous basecoat material of the invention, may if desired comprise at least one crosslinking agent.

Examples of suitable crosslinking agents are amino resins, compounds or resins containing anhydride groups, compounds or resins containing epoxide. groups, tris(alkoxycarbonylamino)triazines, compounds or resins containing carbonate groups, blocked and/or nonblocked polyisocyanates, beta-hydroxyalkylamides, and compounds containing on average at least two transesterifiable groups, examples being reaction products of malonic diesters and polyisocyanates or of esters and partial esters of polyhydric alcohols of malonic acid with monoisocyanates, such as are described by European patent EP-A-0 596 460.

Crosslinking agents of this kind are well known to the skilled worker and are offered by numerous companies as sales products.

Where used in the aqueous basecoat materials of the invention, the crosslinking agents are employed in an amount of from 0.1 to 30%, more preferably from 0.3 to 20%, with particular preference from 0.5 to 10%, and in particular from 1.0 to 8.0% by weight, based in each case on the overall weight of the respective aqueous basecoat material of the invention.

In addition to the constituents described above, the aqueous basecoat material of the invention may comprise customary and known binders and/or additives in effective amounts.

Examples of customary and known binders are oligomeric and polymeric, thermally curable, linear and/or branched and/or block, comb and/or random poly(meth)acrylates or acrylic copolymers, especially those described in patent DE-A-197 36 535, polyesters, especially those described in patent DE-A-40 09 858 or DE-A-44 37 535, alkyds, acrylated polyesters, poly-lactones, polycarbonates, polyethers, epoxy resin-amine adducts, (meth)acrylate diols, partially hydrolyzed polyvinyl esters, polyurethanes and acrylated polyurethanes, such as those described in patents EP-A-0 521 928, EP-A-0 522 420, EP-A-0 522 419, EP-A-0 730 613 or DE-A-44 37 535, or polyureas.

Examples of suitable additives are organic and inorganic fillers such as chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers or wood flour; for further details refer to Römpp Lexikon Lacke und Druckfarben, Georg Thieme Verlag, 1998, pages 250 ff., "Fillers";

thermally curable reactive diluents such as positionally isomeric diethyloctanediols or hydroxyl-containing hyperbranched compounds or dendrimers;

low-boiling and/or high-boiling organic solvents ("long solvents");

UV absorbers;

light stabilizers such as HALS compounds, benzotriazoles or oxalanilides;

free-radical scavengers;

thermally labile free-radical initiators such as organic peroxides, organic azo compounds or C—C-cleaving initiators such as dialkyl peroxides, peroxocarboxylic acids, peroxodicarbonates, per-oxide esters, hydroperoxides, ketone peroxides, azo dinitriles or benzpinacol silyl ethers;

crosslinking catalysts such as dibutyltin dilaurate, lithium decanoate or zinc octoate, or amine-blocked organic sulfonic acids;

devolatilizers such as diazadicycloundecane;

slip additives;

polymerization inhibitors;

defoamers;

emulsifiers, especially nonionic emulsifiers such as alkoxylated alkanols, polyols, phenols and alkylphenols or anionic emulsifiers such as alkali metal salts or ammonium salts of alkanecarboxylic acids, alkanesulfonic acids and sulfo acids of alkoxylated alkanols, polyols, phenols and alkylphenols;

wetting agents such as siloxanes, fluoric compounds, carboxylic monoesters, phosphates, polyacrylic acids and their copolymers, or polyurethanes;

adhesion promoters such as tricyclodecanedimethanol;

leveling agents;

film-forming auxiliaries such as cellulose derivatives;

transparent fillers based on titanium dioxide, silica, alumina or zirconium oxide; for further details refer to Römpp Lexikon Lacke und Druckfarben, Georg Thieme Verlag, Stuttgart, 1998, pages 250 to 252;

rheology control additives, such as those known from patents WO 94/22968, EP-A-0 276 501, EP-A-0 249 201 or WO 97/12945; crosslinked polymeric microparticles, as disclosed for example in EP-A-0 008 127; inorganic phyllosilicates, preferably smectites, especially montmorillonites and hectorites, such as aluminum-magnesium silicates, sodium-magnesium and sodium-magnesium-fluorine-lithium phyllosilicates of the montmorillonite type or inorganic phyllosilicates such as aluminum-magnesium silicates, sodium-magnesium and sodium-magnesium-fluorine-lithium phyllosilicates of the montmorillonite type (for further details refer to the book by Johan Bielemann, "Lackadditive", Wiley-VCH, Weinheim, New York, 1998, pages 17 to 30); silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified polyacrylates; or associative thickeners based on polyurethane, as described in Römpp Lexikon Lacke und Druckfarben, Georg Thieme Verlag, Stuttgart, New York, 1998, "Thickeners", pages 599 to 600, and in the textbook "Lackadditive" by Johan Bieleman, Wiley-VCH, Weinheim, N.Y., 1998, pages 51 to 59 and 65; and/or flame retardants.

Further examples of suitable coatings additives are described in the textbook "Lackadditive" by Johan Bieleman, Wiley-VCH, Weinheim, New York, 1998.

The aqueous basecoat materials of the invention preferably have at spray viscosity a solids content of from 5.0 to 60%, more preferably from 10 to 60%, with particular preference from 13 to 60% and in particular from 13 to 55% by weight, based in each case on the overall weight of the respective aqueous basecoat material of the invention.

The preparation of the aqueous basecoat material of the invention has no special features but instead takes place in a customary and known manner by mixing of the above-described constituents in appropriate mixing equipment such as stirred tanks, dissolvers or extruders in accordance with the techniques suitable for preparing the respective aqueous basecoat materials.

The aqueous basecoat material of the invention is used to produce coatings of the invention, especially multicoat paint systems, on primed or unprimed substrates.

Suitable substrates are all surfaces for coating which are not damaged by curing of the coatings present thereon using heat; they are, for example, metals, plastics, wood, ceramic, stone, textile, fiber assemblies, leather, glass, glass fibers, glass wool and rock wool, mineral-bound and resin-bound building materials, such as plasterboard and cement slabs or roof shingles, and composites of these materials. Accordingly, the coating of the invention is also suitable for applications outside that of automobile finishing. In this context it is particularly suitable for the coating of furniture and for industrial coating, including coil coating, container coating, and the impregnation or coating of electrical components. In the context of industrial coatings it is suitable for coating virtually all parts for domestic or industrial use, such as radiators, domestic appliances, small metal parts such as screws and nuts, hubcaps, wheel rims, packaging, or electrical components such as motor windings or transformer windings.

In the case of electrically conductive substrates it is possible to use primers which are produced in a customary and known manner from electrodeposition coating materials. Both anodic and cathodic electrodeposition coating materials are suitable for this purpose, but especially cathodics.

With the multicoat paint system of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations according to DIN 7728T1). The plastics for coating may of course also be polymer blends, modified plastics or fiber-reinforced plastics. The plastics normally used in constructing vehicles, especially motor vehicles, can also be used.

In the case of nonfunctionalized and/or apolar substrate surfaces, these may be subjected prior to coating in a known manner to a pretreatment, such as with a plasma or by flaming, or may be provided with a water-based primer.

The multicoat paint systems of the invention may be produced in different ways.

A first preferred variant of the process of the invention comprises the steps of:

(I) preparing a basecoat film by applying the aqueous basecoat material of the invention to the substrate, (II) drying the basecoat film, (III) preparing a clearcoat film by applying a clearcoat material to the basecoat film, and (IV) jointly curing the basecoat film and the clearcoat film to give the basecoat and the clearcoat (wet-on-wet technique).

This variant affords particular advantages especially in the context of coating plastics and is therefore employed with particular preference in that utility.

A second preferred variant of the process of the invention comprises the steps of:

(I) preparing a surfacer film by applying a surfacer to the substrate, (II) curing the surfacer film to give the surfacer coat, (III) preparing a basecoat film by applying the aqueous basecoat material of the invention to the surfacer coat, (IV) drying the basecoat film, (V) preparing a clearcoat film by applying a clearcoat material to the basecoat film, and (VI) jointly curing the basecoat film and the clearcoat film to give the basecoat and the clearcoat (wet-on-wet technique).

A third preferred variant of the process of the invention comprises the steps of:

(I) preparing a surfacer film by applying a surfacer to the substrate, (II) drying the surfacer film, (III) preparing a basecoat film by applying the aqueous basecoat material of the invention to the surfacer film, (IV) drying the basecoat film, (V) preparing a clearcoat film by applying a clearcoat material to the basecoat film, and (VI) jointly curing the surfacer film, the basecoat film, and the clearcoat film to give the surfacer, the basecoat, and the clearcoat (extended wet-on-wet technique).

The two latter variants afford particular advantages especially in the context of the coating of automobile bodies and are therefore employed with very particular preference in that utility.

It proves here to be a further particular advantage of the aqueous basecoat material of the invention and of the process of the invention that in fact all customary and known clearcoat materials may be combined with the aqueous basecoat film of the invention as part of the processes of the invention.

Examples of suitable known one-component (1K), two-component (2K) or multicomponent (3K, 4K) clearcoat materials are known from patents DE-A-42 04 518, U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 or WO 92/22615.

One-component (1K) clearcoat materials comprise, as is known, hydroxyl-containing binders and crosslinking agents such as blocked polyisocyatnates, tris(alkoxycarbonylamino) triazines and/or amino resins. In a further variant they contain as binders polymers containing pendant carbamate and/or allophanate groups, and carbamate- and/or allophanate-modified amino resins as crosslinking agents (cf. U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071 or EP-A-0 594 142).

The essential constituents present in two-component (2K) or multicomponent (3K, 4K) clearcoat materials are known to be hydroxyl-containing binders and polyisocyanate crosslinking agents, which are stored separately up until they are used.

Examples of suitable powder clearcoat materials are, for example, known from German patent DE-A-42 22 194 or from the BASF Lacke+Farben AG product information bulletin "Pulverlacke", 1990.

Powder clearcoat materials include as their essential constituents, as is known, binders containing epoxide groups and polycarboxylic acid crosslinking agents.

Examples of suitable powder slurry clearcoat materials are known, for example, from U.S. Pat. No. 4,268,542, international patent application WO 96/32452, and German patent applications DE-A-195 18 392.4 and DE-A-196 13 547, or are described in German patent application DE-A-198 14 471.7, unpublished at the priority date of the present specification.

Powder slurry clearcoat materials comprise, as is known, powder clearcoat materials in dispersion in an aqueous medium.

UV-curable clearcoat materials are disclosed, for example, in patents EP-A-0 540 884, EP-A-0 568 967 or U.S. Pat. No. 4,675,234.

Powder slurry clearcoat materials offer particular advantages for the multicoat paint system of the invention and are therefore used with particular preference in accordance with the invention.

Furthermore, the clearcoats may additionally be coated with at least one further clearcoat, an example being an organically modified ceramic coat, thereby making it possible to bring about significant improvement in the mar resistance of the multicoat paint system of the invention.

The multicoat paint systems of the invention may therefore have a variable structure.

In a first preferred variant of the multicoat paint system of the invention, (1) the color and/or effect basecoat and
(2) a clearcoat lie above one another in the stated sequence. This preferred variant is employed in particular in the context of coating plastics.

In the second preferred variant of the multicoat paint system of the invention, (1) a surfacer coat which absorbs mechanical energy,
(2) the color and/or effect basecoat, and
(3) a clearcoat lie above one another in the stated sequence. This variant is employed in particular in the context of automobile finishing.

The aqueous basecoat material of the invention may be applied by all customary application methods, such as spraying, knifecoating, brushing, flowcoating, dipping, impregnating, trickling, or rolling, for example. The substrate to be coated may itself be at rest, with the application equipment or unit being moved. Alternatively, the substrate to be coated, especially a coil, may be moved, with the application unit being at rest relative to the substrate or being moved appropriately.

Preference is given to the use of spray application methods, such as compressed-air spraying, airless spraying, high-speed rotation, electrostatic spray application (ESTA), alone or in conjunction with hot spray applications such as hot-air spraying, for example. Application may be conducted at temperatures of max. 70 to 80° C., so that suitable application viscosities are achieved without the short-term thermal stress being accompanied by any change in or damage to the aqueous basecoat material and its overspray, which may be intended for reprocessing. For instance, hot spraying may be configured such that the aqueous basecoat material is heated in the spray nozzle for only a very short time, or is heated just a short way upstream of the spray nozzle.

The spray booth used for the application may be operated, for example, with an optionally temperature-controllable circulation, which is operated with an appropriate absorption medium for the overspray, an example being the aqueous basecoat material itself.

In general, the surfacer film, basecoat film, and clearcoat film are applied in a wet film thickness such that they cure to give coats having the coat thicknesses which are necessary and advantageous for their functions. In the case of the surfacer coat, this coat thickness is from 10 to 150, preferably from 10 to 120, with particular preference from 10 to 100, and in particular from 10 to 90 $\mu$m; in the case of the basecoat it is from 5 to 50, preferably from 5 to 40, with particular preference from 5 to 30, and in particular from 10 to 25 $\mu$m; and in the case of the clearcoat it is from 10 to 100, preferably from 15 to 80, with particular preference from 20 to 70, and in particular from 25 to 60 $\mu$m.

The surfacer film, basecoat film, and clearcoat film are cured thermally.

Full curing may take place after a certain rest time. Its duration may be from 30 s to 2 h, preferably from 1 min to 1 h, and in particular from 1 min to 45 min. The rest time serves, for example, for the coating films to flow and undergo devolatilization, or for the evaporation of volatile constituents such as solvents. The rest time may be assisted and/or shortened by the application of elevated temperatures of up to 90° C. and/or by a reduced atmospheric humidity <10 g water/kg air, particularly <5 g/kg air, provided no damage or alteration to the paint films occurs in this case, such as premature complete crosslinking.

The thermal cure has no special features in terms of its method but instead takes place in accordance with the customary and known methods such as heating in a forced air oven or exposure to IR lamps. This thermal cure may also take place in stages. The thermal cure takes place advantageously at a temperature of from 50 to 100° C., with particular preference 60 to 100° C., and in particular 80 to 100° C. for a period of from 1 min up to 2 h, with particular preference from 2 min up to 1 h, and in particular from 3 min to 45 min. Where substrates are used which have high thermal load-bearing capacities, thermal crosslinking may also be conducted at temperatures above 100° C. In this case it is generally advisable not to exceed temperatures of 180° C., preferably 160° C., and in particular 155° C.

In the case of the clearcoats, curing may also take place with actinic radiation or both thermally and with actinic radiation (dual cure), depending on the clearcoat material used. Suitable actinic radiation is electromagnetic radiation such as near infrared (NIR) light, visible light, UV radiation or X-rays and/or corpuscular radiation such as electron beams.

The multicoat paint systems of the invention exhibit an outstanding profile of properties which is very well balanced in terms of mechanics, optics, corrosion resistance, and adhesion. Thus the multicoat paint systems of the invention possess the high optical quality and intercoat adhesion required by the market and do not give rise to any problems such as deficient condensation resistance, cracking (mud cracking) or leveling defects or surface textures in the clearcoats.

In particular, the multicoat paint systems of the invention exhibit an outstanding metallic effect, an excellent D.O.I. (distinctiveness of the reflected image), and an outstanding surface smoothness. They are weathering-stable, resistant to chemicals and bird droppings, are mar resistant, and exhibit very good reflow behavior.

Not least, however, it proves to be a very special advantage that by use of the aqueous basecoat materials of the invention in the production of the multicoat paint systems of the invention no cracking or popping marks now result even when the aqueous basecoat films are overcoated with powder slurry clearcoat materials and subsequently baked together with them. By this means it is possible to combine the particular advantages of aqueous basecoat materials with the particular advantages of powder slurry clearcoat materials. Moreover, these very same multicoat paint systems of the invention prove to be particularly firmly adhering, even when used as refinishes.

Accordingly, the substrates coated with them also have particular advantages such as a longer service life, a better aesthetic impression for the viewer, and a better technological usefulness, so making them particularly attractive economically in particular for the OEM finishing of automobiles.

EXAMPLES AND COMPARATIVE EXPERIMENTS

Preparation Example 1

The Preparation of an Adduct (B2) for Inventively Preferred Use

A reaction vessel equipped with stirrer, internal thermometer, reflux condenser and electrical heating was charged with 429 parts by weight of methyl ethyl ketone, 182 parts by weight of N-methylpyrrol-idone and 210 parts by weight of diethanolamine at 20° C. Added dropwise to this mixture over the course of one and a half hours were 402 parts by weight of 1-(1-isocyanato-1-methylethyl)-3-(1-methylethenyl)-benzene (TMI® from the company CYTEC) in such a way that the reaction temperature did not exceed 40° C. The resultant reaction mixture was stirred until free isocyanate groups were no longer detectable. It was then stabilized with 200 ppm of hydroquinone. The solids content of the reaction mixture was 50% by weight.

Preparation Example 2

The Preparation of a Compound (B1.1) for Inventive Use

A jacketed reaction vessel with a heat transfer oil heating system, equipped with stirrer, internal thermometer and reflux condenser, was charged with 289.8 parts by weight of methyl ethyl ketone, 124.2 parts by weight of N-methylpyrrolidone and 222 parts by weight of isophorone diisocyanate at 20° C. With intensive cooling, 87 parts by weight of methyl ethyl ketoxime were metered in over the course of five minutes. After the exothermic reaction had subsided, 105 parts by weight of diethanolamine were added dropwise over the course of two minutes. The resultant reaction mixture was subsequently stirred until free isocyanate groups were no longer detectable.

EXAMPLE 1

The Preparation of an Inventive Polyurethane (B)

In a reaction vessel equipped with stirrer, internal thermometer, reflux condenser and electrical heating, 685.2 parts by weight of a linear polyester polyol (prepared from dimerized fatty acid (Pripol® 1013), isophthalic acid and 1,6-hexanediol) having a hydroxyl number of 80 and a number-average molecular weight of 1400 daltons and 108.2 parts by weight of dimethylolpropionic acid were dissolved in 394.4 parts by weight of methyl ethyl ketone and 87.9 parts by weight of N-methylpyrrolidone. 96.4 parts by weight of the compound (B1.1) from preparation example 2 were added to the resulting solution. The reaction mixture was warmed to 45° C., after which 377.3 parts by weight of isophorone diisocyanate were added. After the exothermic reaction had subsided, the reaction mixture was slowly heated to 80° C. with stirring. It was stirred further at this temperature until the free isocyanate group content was constant at 0.65 to 0.8% by weight giving the prepolymer B1. The reaction mixture was then cooled to 70° C. and 121.3 parts by weight of the adduct (B2) from preparation example 1 were added. The resulting reaction mixture was stirred at 70° C. until the free isocyanate group content was constant at 0.18 to 0.25% by weight. Then 1.8 parts by weight of methyl ethyl ketoxime were added and the resulting reaction mixture was stirred at 70° C. until free isocyanate groups were no longer detectable. At 60° C., 150 parts by weight of methoxypropanol and 62.5 parts by weight of triethylamine were added to the resultant dissolved polyurethane (B). 30 minutes after adding the amine, 2.222 parts by weight of deionized water were added with stirring over the course of 30 minutes. The methyl ethyl ketone was removed from the resulting dispersion by distillation under reduced pressure at 60° C. After that, any losses of solvent and of water were compensated. The resultant dispersion of the inventive polyurethane (B) had a solids content of 33.0% by weight (one hour at 130° C.), a pH of 7.3 and an acid number of 37.2 mg KOH/g.

EXAMPLE 2

The Preparation of the Primary Dispersion of an Inventive Graft Copolymer 1856.1 parts by weight of the polyurethane dispersion (B) from example 1 were diluted with 887.5 parts by weight of deionized water and heated to 85° C. At this temperature, a mixture of 175.2 parts by weight of styrene, 175.2 parts by weight of methyl methacrylate, 131.1 parts by weight of n-butyl acrylate and 131.1 parts by weight of hydroxyethyl methacrylate was added to the dispersion at a uniform rate over the course of 3.5 hours with stirring. At the same time as commencement of the addition of the monomer mixture, a solution of 9.2 parts by weight of tert-butyl peroxyethylhexanoate in 134.8 parts by weight of methoxypropanol was added over the course of 3.75 hours. The resulting reaction mixture was stirred at 85° C. until all of the monomers had reacted, with small amounts of additional initiator being added. The weight ratio of polyurethane (B) to methacrylate copolymer (A) was 1:1. The resulting primary dispersion of the graft copolymer 1 had a very good storage stability. Its solids content was 35.5% by weight (one hour at 130° C.) and its pH was 7.3.

COMPARATIVE EXPERIMENT C1

The Preparation of a Known Polyurethane Containing Ethenylarylene Groups

A hydroxyl-containing polyester was prepared in accordance with the instructions given in patent EP-A-0 608 021, page 6 lines 22 to 37 (intermediate A). For this purpose, a mixture of 236 parts by weight of 1,6-hexanediol, 208 parts by weight of neopentyl glycol, 616 parts by weight of hexahydrophthalic anhydride and 6 parts by weight of benzyltriphenyl-phosphonium chloride was charged to an appropriate reaction vessel and heated to 120° C. under nitrogen and with stirring. After one hour at this temperature, the reaction mixture was heated to 140° C. Subsequently, 1000 parts by weight of the glycidyl ester of 1,1-dimethyl-1-heptanecarboxylic acid (Cardura® E-10 from Shell) were metered in over two hours. After four hours, the reaction mixture had an acid number of 8.5 mg KOH/g. A further 80 parts by weight of Cardura® E-10 were added. After another two hours, the acid number of the reaction mixture was less than 1 mg KOH/g.

In accordance with the instructions given on page 7 lines 1 to 27 (Example I) of patent EP-A-0 608 021, 261.6 parts by weight of the above-described polyester, 55 parts by weight of N-methyl-pyrrolidone and 0.1 part by weight of dibutyltin diacetate were taken as initial charge. 72.1 parts by weight of isophorone diisocyanate were metered into this mixture over the course of one hour at 90° C. After two hours at 90° C., the reaction mixture was heated to 100° C. At this temperature, 16.3 parts by weight of TMI® were metered in over 15 minutes. The resulting reaction mixture was held at a hundred ° C. for one hour.

Thereafter, the reaction mixture was heated to 130° C. and at this temperature a mixture of 38.2 parts by weight of styrene, 9.2 parts by weight of methyl methacrylate, 33.1 parts by weight of acrylic acid, 66 parts by weight of Cardura® E-10, 2.7 parts by weight of dicumyl peroxide, 0.8 part by weight of 3-mercaptopropionic acid and 51.9 parts by weight of 2-butoxyethanol was added over the course of one hour under nitrogen and with stirring. The resulting reaction mixture was held at this temperature for three hours. Subsequently, at 115° C., 18.1 parts by weight of dimethylethanolamine were metered in. After the mixture had cooled to 90° C., 782 parts by weight of deionized water were metered in dropwise with stirring over three hours, giving a secondary dispersion having a solids content of 35.8% by weight.

EXAMPLE 3 AND COMPARATIVE EXPERIMENTS C2 AND C3

The Preparation of an Inventive Aqueous Basecoat Material (Example 3) and Noninventive Aqueous Basecoat Materials Comparative Experiments C2 and C3

For inventive example 3, 9.5 parts by weight of deionized water were charged to a mixing vessel. With stirring, 10.5 parts by weight of an aqueous acrylate dispersion [component (i) in accordance with patent DE-A-197 36 535; Acronal® 290 D from BASF Aktiengesellschaft], 13.5 parts by weight of the inventive primary dispersion of example 2, 10.4 parts by weight of the thickener 1 (paste of a synthetic sodium-magnesium phyllosilicate from Laporte, 3% in water), 8.0 parts by weight of deionized water, 0.28 parts by weight of a 15% strength aqueous ammonia solution and 18.0 parts by weight of the thickener 2 (3% strength aqueous solution of a polyacrylic acid thickener from Allied Colloids) were added.

Subsequently, with stirring, 4.2 parts by weight of a pigment paste having a carbon black content of 10% by weight and containing 60% by weight of the acrylated polyurethane dispersion in accordance with example D of patent DE-A-44 37 535, 10.2 parts by weight of a filler paste having an Aerosil content of 10% by weight and containing 50% by weight of the acrylated polyurethane dispersion in accordance with example D of patent DE-A-44 37 535, 2.0 parts by weight of butyl glycol and 3.5 parts by weight of a methanol- and butanol-etherified melamine resin from CYTEC were added.

In a separate mixing vessel, a mixture of 0.4 parts by weight of a commercial aluminum bronze (Alu-Stapa Hydrolux® from Eckart, Al content 65% by weight) and 0.6 parts by weight of butyl glycol was stirred together. This mixture was subsequently added in portions and with vigorous stirring to the other mixture.

In a further separate mixer, 1.3 parts by weight of a pearlescent pigment (Iriodin® 9103 Sterling Silber WR from Merck) and 2.3 parts by weight of butyl glycol were mixed. This mixture was subsequently added in portions, again with vigorous stirring, to the mixture described above.

Table 1 gives an overview of the composition of the inventive aqueous basecoat material of example 3.

For comparative experiment C2, example 3 was repeated but replacing the inventive primary dispersion of example 2 by the aqueous polyurethane resin dispersion of example 1 of patent DE-A-43 39 870 [component (ii)].

For comparative experiment C3, example 3 was repeated but replacing the inventive primary dispersion of example 2 by the known secondary dispersion of comparative experiment C1.

The material composition of the noninventive aqueous basecoat materials C3 and C2 is likewise given in table 1.

TABLE 1

The composition of the inventive aqueous basecoat material (example 3) and of the noninventive aqueous basecoat materials (comparative experiments C2 and C3)

| Constituents | Comparative experiments: C2 | C3 | Example: |
|---|---|---|---|
| Deionized water | 9.5 | 9.5 | 9.5 |
| Component (i) | 10.5 | 10.5 | 10.5 |
| Component (ii) | 13.5 | — | — |
| Secondary dispersion C1 | — | 13.5 | — |
| Primary dispersion (ex. 2) | — | — | 13.5 |
| Thickener 1 | 10.4 | 10.4 | 10.4 |
| Deionized water | 8.0 | 8.0 | 8.0 |
| Ammonia solution | 0.28 | 0.28 | 0.28 |
| Thickener 2 | 18.0 | 18.0 | 18.0 |
| Pigment paste | 4.2 | 4.2 | 4.2 |
| Filler paste | 10.2 | 10.2 | 10.2 |
| Butyl glycol | 2.0 | 2.0 | 2.0 |
| Melamine resin | 3.5 | 3.5 | 3.5 |
| Aluminum paste | 0.4 | 0.4 | 0.4 |
| Butyl glycol | 0.6 | 0.6 | 0.6 |
| Iriodin 9103 | 1.3 | 1.3 | 1.3 |
| Butyl glycol | 2.3 | 2.3 | 2.3 |

The viscosity of the aqueous basecoat materials of table 1 was adjusted using deionized water to from 90 to 95 mPas at a shear rate of 1000/s.

EXAMPLE 4 AND COMPARATIVE EXPERIMENTS C4 AND C5

The Preparation of an Inventive Multicoat Paint System (Example 4) and of Noninventive Multicoat Paint Systems Comparative Experiments C4 and C5

The inventive multicoat paint system of example 4 was prepared using the inventive aqueous basecoat material of example 3 (cf. table 1).

The noninventive multicoat paint system of comparative experiment C4 was prepared using the noninventive aqueous basecoat material of comparative experiment C2 (cf. table 1).

The noninventive multicoat paint system of comparative experiment C5 was prepared using the noninventive aqueous basecoat material of comparative experiment C3 (cf. table 1).

A. The Preparation of the Test Panels:

For example 4 and the comparative experiments C4 and C5, test panels were first of all prepared. This was done by coating steel panels (bodywork panels), which had been coated with a customary and known cathodically deposited and baked electrodeposition coating, with a commercial thin-film surfacer (Ecoprime® 60 from BASF Coatings AG; anthracite-colored), after which the resulting surfacer film was flashed off at 20° C. and a relative atmospheric humidity of 65% for five minutes and dried at 80° C. in a forced-air oven for five minutes. Subsequently, the surfacer film had a dry film thickness of 15 $\mu$m.

Following the cooling of the test panels to 20° C., the aqueous basecoat materials of table 1 were applied, flashed off at 20° C. and a relative atmospheric humidity of 65% for five minutes and dried at 80° C. in a forced-air oven for five minutes, so that the dried basecoat films had a dry film thickness of approximately 15 $\mu$m.

After the test panels had again been cooled to 20° C., the basecoat films were overcoated with a powder slurry clearcoat material in accordance with international patent application WO 96/32452. The resulting powder slurry clearcoat films were flashed off at 20° C. and a relative atmospheric humidity of 65% for 3 minutes, and dried at 55° C. in a forced-air oven for five minutes. The dry film thickness of the resulting clearcoat films was from 55 to 57 $\mu$m.

Following the application of all three films, they were baked jointly at 155° C. for 30 minutes, to give the inventive multicoat paint system of example 3 and the noninventive multicoat paint systems of the comparative experiments C4 and C5.

B. The Production of Refinish Coats:

To simulate the refinishing of the entire body on the line (line refinish), the test panels from example 3 and from the comparative experiments C4 and C5 were roughened with a 1200 grit abrasive paper and, in accordance with the instructions described above, were coated again with the same multicoat paint system in each case (double coating).

C. The Determination of the Popping Limit and Cracking Limit (Mud Cracking):

In accordance with the instructions given in section A. above, multicoat paint systems were produced in which the basecoats were applied in a wedge from 3 to 40 $\mu$m. The clearcoats had a coat thickness of from 55 to 57 $\mu$m. The cracking limit and popping limit indicate the coat thickness above which surface defects (in this case popping marks and mud cracking) appear in the clearcoat. The cracking limit and the popping limit are a measure of the compatibility of the aqueous basecoat material with the clearcoat material, or of the basecoat with the clearcoat; the higher the cracking limit or the popping limit, the better the compatibility. The corresponding results are given in table 2.

D. The Testing of the Clearcoat Adhesion:

The clearcoat adhesion was tested on unstressed test panels [cf. section A. above (original finish) and section B. above (refinish)] after three days of storage at room temperature. For this purpose, using a knife or a pointed mandrel, the multicoat paint systems were scored down to the steel surface. The score marks were then subjected to a jet of water under high pressure for one minute (high-pressure cleaner from Karcher), the water pressure being 230 bar, the water temperature 20° C., and the distance of the rotating spray nozzle from the test panels 6 cm. Assessment was made visually: if the multicoat paint system showed no damage, it was assessed as being "satisfactory" (sat.). If delamination occurred, this was assessed as being "unsatisfactory" (unsat.). The results are likewise given in table 2.

E. The Testing of the Intercoat Adhesion After Ball Shot Testing:

Ball shot testing was carried out in accordance with the DaimlerChrysler specification, which is general knowledge among those skilled in the art. The corresponding results are likewise given in table 2.

F. The Testing of the Intercoat Adhesion After Constant Condensation Climate Exposure to DIN 50017:

The test panels produced in accordance with the instructions indicated in section A. were subjected to the constant condensation climate of DIN 50017. Subsequently, after 0 and 2 hours of regeneration, the intercoat adhesion was determined using the cross-cut test in accordance with DIN EN ISO 2409. The results are likewise given in table 2.

TABLE 2

The results of the tests of sections C. to F.

|  | Comparative experiments: | | Example: |
| --- | --- | --- | --- |
| Tests | C4 | C5 | 4 |
| Section C.: | | | |
| Cracking limit ($\mu$m): | 23 | 10 | 37 |
| Popping limit ($\mu$m): | 24 | 16 | 28 |
| Section D.: | | | |
| Water jet test: | unsat.[1] | unsat.[1] | sat.[2] |
| Section E.: | | | |
| Ball shot testing: | | | |
| Original finish | 8/1 | 11/0 | 6/1 |
| Refinish | 15/0 | 30/0 | 14/1 |
| Section F.: | | | |
| Cross-cut test: | | | |
| After 0 hours' regeneration | GT0 | GT2–3 | GT0 |
| After 2 hours' regeneration | GT0 | GT2 | GT0 |

[1]extensive clearcoat delamination
[2]no significant delamination

The results of table 2 demonstrate that the inventive aqueous basecoat material of example 3 and the inventive multicoat paint system of example 4 are clearly superior, in terms of the compatibility of aqueous basecoat and powder slurry clearcoat, and the intercoat adhesion, to the noninventive aqueous basecoat materials of comparative experiments C2 and C3 and to the noninventive multicoat paint systems of comparative experiments C4 and C5. Also underscored is the fact that the noninventive aqueous basecoat material of comparative experiment C3 is not compatible with the powder slurry clearcoat material, and the noninventive multicoat paint system C5 produced using it has very poor individual impact resistance.

What is claimed is:

1. A self-crosslinking polyurethane containing at least one ethenylarylene group, wherein the ethenylarylene group is at least one of pendant and terminal, comprising a reaction product of
   (1) at least one polyurethane prepolymer containing at least one free and at least one blocked isocyanate group; and
   (2) at least one adduct comprising a reaction product of
       (2.1) at least one ethenylarylene monoisocyanate, and
       (2.2) at least one of i) a polyol, ii) a polyamine, and iii) a compound that contains at least one hydroxyl group and at least one amino group,
           wherein at least one isocyanate-reactive group remains in the adduct.

2. The polyurethane of claim 1 wherein the ethenylarylene monoisocyanate has the general formula I:

$$CH_2=C(R)-A-X-NCO \qquad (I)$$

wherein:
   A=substituted or unsubstituted $C_6$–$C_{20}$ arylene radical;
   R=at least one of a hydrogen atom, a halogen atom, a nitrile group, an unsubstituted alkyl, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl arylalkyl radical, an unsubstituted arylcycloalkyl radical, a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl arylalkyl radical, and a substituted arylcycloalkyl radical; and
   X=divalent organic radical.

3. The polyurethane of claim 1, wherein the polyurethane contains hydrophilic functional groups.

4. The polyurethane of claim 1, wherein the isocyanate groups still present are blocked.

5. The polyurethane of claim 1, wherein a blocking agent for the blocked polyisocyanate comprises at least one ketoxime.

6. A graft copolymer comprising
   A) at least one (meth)acrylate copolymer and
   B) at least one polyurethane prepared by a process comprising:
       1) dispersing at least one self-crosslinking olefinically unsaturated polyurethane containing at least one ethenylarylene group, wherein the ethenylarylene group is at least one of pendant and terminal, and at least one blocked isocyanate group in an aqueous medium; and
       2) free-radical copolymerizing a mixture of at least one monomer containing at least one isocyanate-reactive functional group and at least one monomer copolymerizable therewith in an emulsion in the presence of the polyurethane.

7. The graft copolymer of claim 6, wherein the ethenylarylene group has the general formula II:

$$CH_2=C(R)-A- \qquad (II)$$

wherein:

A=substituted or unsubstituted $C_6$–$C_{20}$ arylene radical; and

R=at least one of a hydrogen atom, a halogen atom, a nitrile group, an unsubstituted alkyl, an unsubstituted cycloalkyl radical, an unsubstituted alkylcycloalkyl radical, an unsubstituted cycloalkylalkyl radical, an unsubstituted aryl radical, an unsubstituted alkylaryl radical, an unsubstituted cycloalkylaryl arylalkyl radical, an unsubstituted arylcycloalkyl radical, a substituted alkyl radical, a substituted cycloalkyl radical, a substituted alkylcycloalkyl radical, a substituted cycloalkylalkyl radical, a substituted aryl radical, a substituted alkylaryl radical, a substituted cycloalkylaryl arylalkyl radical, and a substituted arylcycloalkyl radical.

8. The graft copolymer of claim 7, wherein the ethenylarylene group is attached to the polyurethane main chain by way of a divalent or trivalent linking radical III that contains at least one of a urethane group and a urea group.

9. The graft copolymer of claim 8, wherein the linking radical III contains a group that is at least one of the general formulae IIIa to IIIc $$-X-NH-C(O)-O- \qquad (IIIa),$$

$$-X-NH-C(O)-NH- \qquad (IIIb), and$$

$$-X-NH-C(O)-N< \qquad (IIIc)$$

wherein X is a divalent organic radical.

10. The graft copolymer of claim 6, wherein at least one of the grafted-on (meth)acrylate copolymer and the grafted polyurethane contain at least one hydrophilic functional group.

11. The graft copolymer of claim 10, wherein the grafted polyurethane contains at least one of a carboxylic acid group and a carboxylate group.

12. The graft copolymer of claim 6, wherein the polyurethane comprises a self-crosslinking polyurethane containing at least one ethenylarylene group, wherein the ethenylarylene group is at least one of pendant and terminal, comprising a reaction product of
   (1) at least one polyurethane prepolymer containing at least one free and at least one blocked isocyanate group; and
   (2) at least one adduct comprising a reaction product of
       (2.1) at least one ethenylarylene monoisocyanate, and
       (2.2) at least one of i) a polyol, ii) a polyamine, and iii) a compound that contains at least one hydroxyl group and at least one amino group,
           wherein at least one isocyanate-reactive group remains in the adduct.

13. A composition comprising the polyurethane of claim 1, wherein the composition is one of a sealing compound, an adhesive, and a coating material.

14. The coating material of claim 13, wherein the coating material is an aqueous basecoat material.

15. A multicoat paint system that is one of i) a color paint system, ii) an effect paint system, and iii) a color and effect paint system, comprising a basecoat that is formed from the aqueous basecoat material of claim 14.

16. A process for producing a multicoat paint system, wherein the paint system is one of i) a color paint system, ii) an effect paint system, and iii) a color and effect paint system, on a primed or unprimed substrate, comprising:
   I) preparing a basecoat film by applying the aqueous basecoat material of claim 14 to the substrate,
   (II) drying the basecoat film, (III) preparing a clearcoat film by applying a clearcoat material to the basecoat film, and (IV) jointly curing the basecoat film and the clearcoat film to give a basecoat and a clearcoat.

17. A process for producing a multicoat paint system, wherein the paint system is one of i) a color paint system, ii) an effect paint system, and iii) a color and effect paint system, on a primed or unprimed substrate, comprising:

(I) preparing a surfacer film by applying a surfacer to the substrate, (II) curing the surfacer film to give a surfacer coat, (III) preparing a basecoat film by applying the aqueous basecoat material of claim 14 to the surfacer coat, (IV) drying the basecoat film, (V) preparing a clearcoat film by applying a clearcoat material to the basecoat film, and (VI) jointly curing the basecoat film and the clearcoat film to give a basecoat and a clearcoat.

18. The process of claim 17, wherein the clearcoat material comprises a powder slurry clearcoat material.

19. A process for producing a multicoat paint system, wherein the paint system is one of i) a color paint system, ii) an effect paint system, and iii) a color and effect paint system, on a primed or unprimed substrate, comprising:

(I) preparing a surfacer film by applying a surfacer to the substrate, (II) drying the surfacer film, (III) preparing a basecoat film by applying the aqueous basecoat material of claim 14 to the surfacer film, (IV) drying the basecoat film, (V) preparing a clearcoat film by applying a clearcoat material to the basecoat film, and (VI) jointly curing the surfacer film, the basecoat film, and the clearcoat film to give a surfacer, a basecoat, and a clearcoat.

20. The process of claim 19, wherein the clearcoat material comprises a powder slurry clearcoat material.

21. A composition comprising the graft copolymer of claim 6, wherein the composition is one of a sealing compound, an adhesive, and a coating material.

22. The coating material of claim 21, wherein the coating material is an aqueous basecoat material.

23. A multicoat paint system that is one of i) a color paint system, ii) an effect paint system, and iii) a color and effect paint system, comprising a basecoat that is formed from the aqueous basecoat material of claim 22.

24. A process for producing a multicoat paint system, wherein the paint system is one of i) a color paint system, ii) an effect paint system, and iii) a color and effect paint system, on a primed or unprimed substrate, comprising:

I) preparing a basecoat film by applying the aqueous basecoat material of claim 22 to the substrate, (II) drying the basecoat film, (III) preparing a clearcoat film by applying a clearcoat material to the basecoat film, and (IV) jointly curing the basecoat film and the clearcoat film to give a basecoat and a clearcoat.

25. A process for producing a multicoat paint system, wherein the paint system is one of i) a color paint system, ii) an effect paint system, and iii) a color and effect paint system, on a primed or unprimed substrate, comprising:

(I) preparing a surfacer film by applying a surfacer to the substrate, (II) curing the surfacer film to give a surfacer coat, (III) preparing a basecoat film by applying the aqueous basecoat material of claim 22 to the surfacer coat, (IV) drying the basecoat film, (V) preparing a clearcoat film by applying a clearcoat material to the basecoat film, and (VI) jointly curing the basecoat film and the clearcoat film to give a basecoat and a clearcoat.

26. The process of claim 25, wherein the clearcoat material comprises a powder slurry clearcoat material.

27. A process for producing a multicoat paint system, wherein the paint system is one of i) a color paint system, ii) an effect paint system, and iii) a color and effect paint system, on a primed or unprimed substrate, comprising:

(I) preparing a surfacer film by applying a surfacer to the substrate, (II) drying the surfacer film, (III) preparing a basecoat film by applying the aqueous basecoat material of claim 22 to the surfacer film, (IV) drying the basecoat film, (V) preparing a clearcoat film by applying a clearcoat material to the basecoat film, and (VI) jointly curing the surfacer film, the basecoat film, and the clearcoat film to give a surfacer, a basecoat, and a clearcoat.

28. The process of claim 27, wherein the clearcoat material comprises a powder slurry clearcoat material.

\* \* \* \* \*